United States Patent [19]
Kurata et al.

[11] Patent Number: 5,810,396
[45] Date of Patent: Sep. 22, 1998

[54] ABSTRACT PATTERN PLATE-MAKING SYSTEM AND PRINTED MATTER

[75] Inventors: Michio Kurata; Toshio Modegi; Hideki Murota, all of Tokyo; Eisuke Arai, Miyoshi-machi, all of Japan

[73] Assignee: Dai Nippon Printing Co., Ltd., Tokyo, Japan

[21] Appl. No.: 955,481

[22] Filed: Oct. 2, 1992

[30] Foreign Application Priority Data

Oct. 4, 1991 [JP] Japan .................................. 3-257628
Oct. 4, 1991 [JP] Japan .................................. 3-257629

[51] Int. Cl.⁶ .................................................. B42D 15/00
[52] U.S. Cl. .............................................. 285/93; 285/72
[58] Field of Search ............................. 283/147, 72, 93, 283/73, 17

[56] References Cited

U.S. PATENT DOCUMENTS

| | | | |
|---|---|---|---|
| 4,529,228 | 7/1985 | Kramer | 283/117 |
| 4,924,078 | 5/1990 | Sant'Anselmo et al. | 283/117 X |
| 5,110,156 | 5/1992 | Axelrod | 283/117 |

Primary Examiner—Willmon Fridie, Jr.
Attorney, Agent, or Firm—Dellett and Walters

[57] ABSTRACT

An abstract pattern plate-making system removes an undesired pattern from an endless pattern in the process for making a plate for printing abstract patterns on architectural materials. For this purpose, it has a scramble processing part 10 and a pixel copy processing part 11.

The scramble processing part 10 divides endless pattern data into blocks and repeats processing in which pattern data in two blocks selected at random from among the divided blocks are combined together by a composition technique using mask data having a predetermined pattern, thereby removing an undesired pattern. The mask pattern size may be either smaller or larger than the block size. The mask pattern may be a multi-valued pattern. Further, when the endless pattern is divided into blocks, the blocks may be allotted so as to be a little offset from the endless pattern.

The pixel copy processing part 11 first prepares mask data on the basis of designated pattern data in the endless pattern data and then repeats processing in which pixel data at a designated position is copied to another designated position on the basis of the prepared mask data, thereby removing an undesired pattern.

10 Claims, 19 Drawing Sheets

FIG. 4
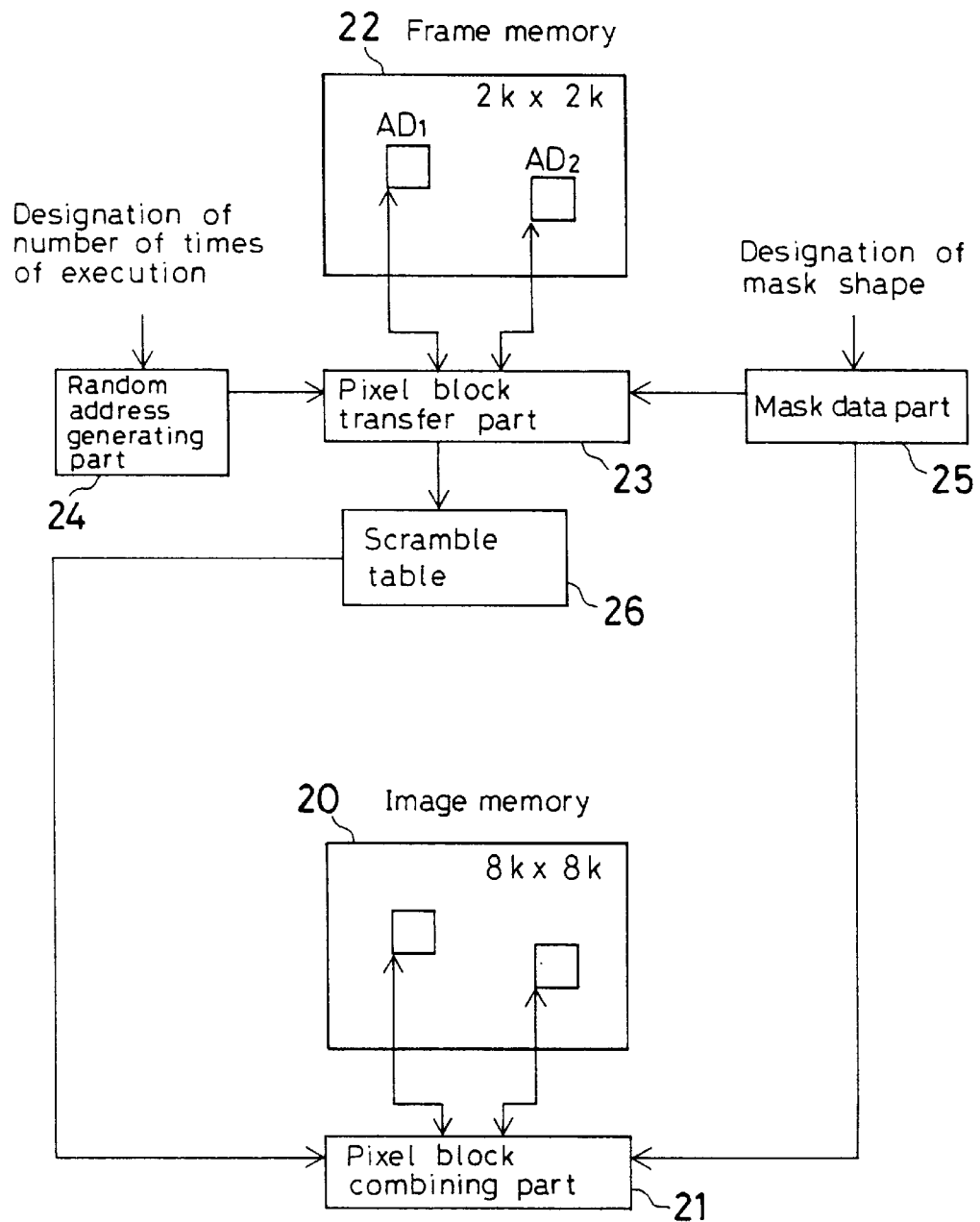
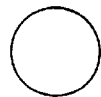
FIG.5A
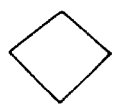
FIG.5B
FIG.5C
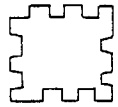
FIG.5D
FIG.5E

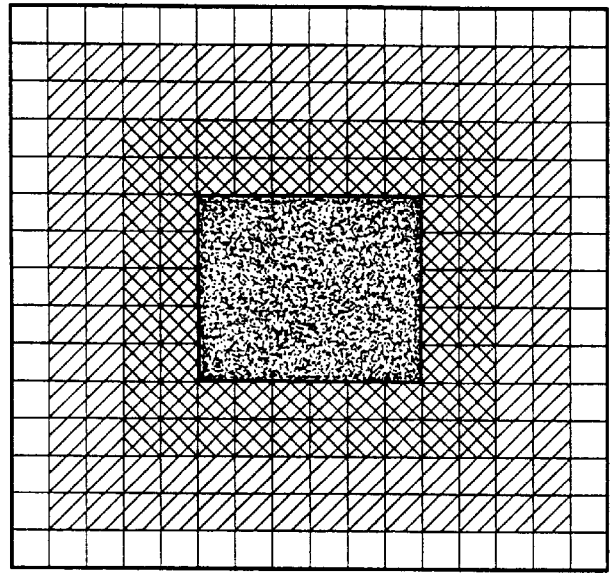
FIG.6
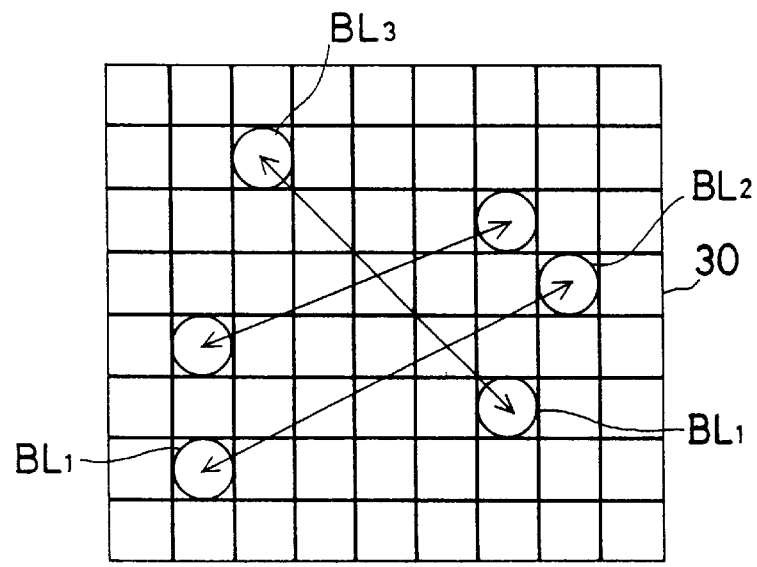
FIG.7A  FIG.7B
FIG. 8

FIG. 9
| 8 | 4 | 12 | 16 |
|---|---|----|----|
| 13| 10| 1  | 6  |
| 5 | 15| 7  | 11 |
| 2 | 9 | 3  | 14 |
FIG. 10
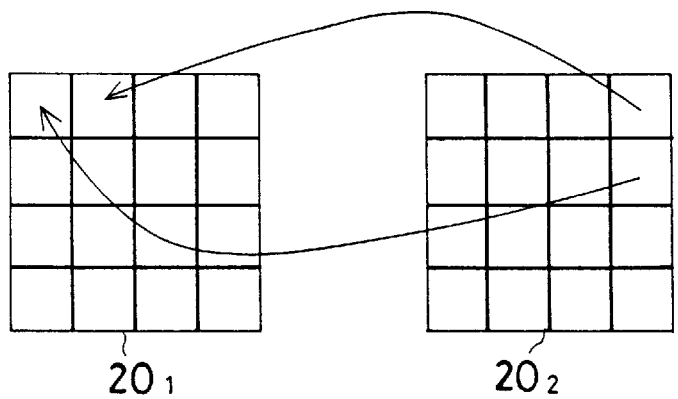
$20_1$  $20_2$
FIG. 11
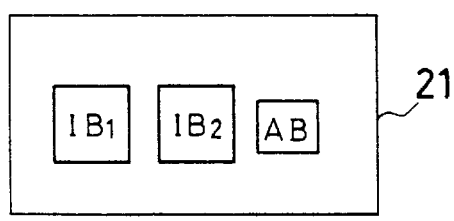
21
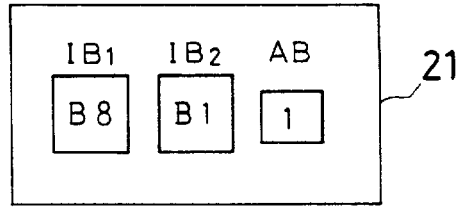
FIG.12A  FIG.12B

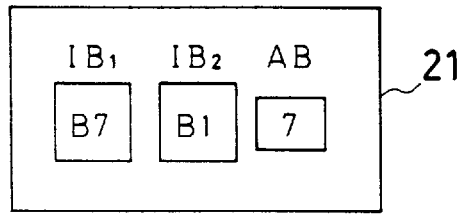
FIG.13A
FIG.13B
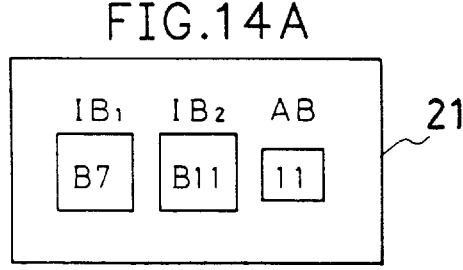
FIG.14A
FIG.15
FIG.14B

½ of endless cycle

Mode 0 (Mode value=0)

| $R_1$ | $R_2$ |
|---|---|
| $R_3$ | $R_4$ |

FIG.33A

Mode 1 (Mode value=1)

| $R_2$ | $R_1$ |
|---|---|
| $R_4$ | $R_3$ |

FIG.33B

Mode 2 (Mode value=2)

| $R_3$ | $R_4$ |
|---|---|
| $R_1$ | $R_2$ |

FIG.33C

Mode 3 (Mode value=3)

| $R_4$ | $R_3$ |
|---|---|
| $R_2$ | $R_1$ |

FIG.33D

Mode 4 (Mode value=4)

| $R_3$ | $R_4$ |
|---|---|
| $R_2$ | $R_1$ |

FIG.33E

Mode 5 (Mode value=5)

| $R_4$ | $R_3$ |
|---|---|
| $R_1$ | $R_2$ |

FIG.33F

| Endless pattern | Endless pattern | Endless pattern |
|---|---|---|
| Endless pattern | Endless pattern | Endless pattern |
| Endless pattern | Endless pattern | Endless pattern |

FIG.34A

| Endless pattern | Endless pattern | Endless pattern | |
|---|---|---|---|
| less ern | Endless pattern | Endless pattern | End patt — $E_1$ |
| $E_2$ — Endless pattern | Endless pattern | Endless pattern | |

FIG.34B

ABSTRACT PATTERN PLATE-MAKING SYSTEM AND PRINTED MATTER

BACKGROUND OF THE INVENTION

The present invention relates to a plate-making system for printing abstract patterns on architectural materials, and it also relates to a printed matter obtained by using a press plate that is made by the plate-making system.

Recently, various architectural materials, e.g., plywood, gypsum boards, etc., have been developed to substitute for wood and other natural materials, which are now in short supply, and the role of architectural material printing has become important as a means for decorating and protecting the surfaces of such architectural materials.

Known patterns, which are used in architectural material printing, include grain patterns that imitate patterns of natural materials, e.g., woodgrain, marble grain, etc., and abstract patterns that are created by man, e.g., geometrical pattern, sand pattern, ground tints, flower pattern, etc. Since the present invention relates to the latter patterns, that is, abstract patterns, making of plates for printing abstract patterns will be explained below.

A conventional plate-making process for abstract patterns is shown schematically in FIGS. 35A and 35B.

As shown in FIG. 35A, a material sample of an abstract pattern, which is in the form of a design, a photograph, etc., is delivered to the plate-making process. Then, the material sample is photographed with a process camera to make separation film. Then, the image of the film is repeated by means of film composition with a proper mask used in order to cancel an edge that may be present between each pair of adjacent material samples, thereby making a proofing plate (hereinafter referred to as "baby plate"). The film, which is obtained by photographing the material sample, is usually about 3 cm to 5 cm square. However, a plate 102 which is about 1 m square can be made by repeating the image of the film 101 nine times for each of the vertical and horizontal directions, as shown in FIG. 35B. The plate 102 is generally called "baby plate".

Next, gravure engraving is performed on the basis of the baby plate to make a press plate for gravure printing. Then, proofing is carried out with the press plate. If the desired abstract pattern is obtained with this press plate, the image of the baby plate is repeated to make a plate for actual printing operation, and a press plate is made on the basis of the plate thus made. With the press plate, proofing is carried out again. If the desired abstract pattern is obtained with this press plate, actual printing operation is carried out on the printing machine therefor.

In the above process, the baby plate is made by film composition, and the whole process is carried out manually by the operator. However, attempts have recently been made at electronically executing a part of the process by using a layout scanner to carry out the steps of reading, for example, a film having a material sample photographed thereon, repeating the read image data, outputting the resulting image data in the form of film, and making a baby plate on the basis of the film. However, in this case also, the step of making a plate for actual printing operation by repeating the image of the baby plate is carried out manually by photocomposition.

However, almost all the steps of the conventional plate-making process for printing abstract patterns on architectural materials are performed by manual operation, as described above. Therefore the prior art suffers from the problem that the cost is extremely high, and it also involves the following problem: That is, there are cases where a material sample has unevenness of density or deviation of the pattern. The density unevenness and the pattern deviation are not serious problems on the material sample level. However, when a baby plate is made by repeating such a material sample, the density unevenness or the pattern deviation is emphasized so as to appear as a repeating pattern which the originator or the designer does not intend to appear. As a result, the repeating pattern is more conspicuous than the abstract pattern, which gives rise to a serious problem (the undesired repeating pattern, which the originator or the designer does not intend to appear, will hereinafter be referred to as "glitch"). For example, it is assumed that a material sample 103 with a fine pattern (not shown) has unevenness of density such as that shown by reference numeral 104, as shown in FIG. 36A, and a baby plate 105 is made by repeating the material sample 103 seven times in the horizontal direction and four times in the vertical direction, as shown in FIG. 36B. If a press plate is made on the basis of the baby plate 105 and gravure printing is carried out with the press plate, the repeating pattern of the density unevenness is emphasized, causing a glitch, as shown in FIG. 36C. If joints are added to the pattern as shown in FIG. 36D, the lattice pattern of the joints is conspicuous, while the glitch becomes inconspicuous relative to the lattice pattern. Accordingly, the glitch is not a serious problem although it still exists.

Thus, the occurrence of a glitch is a fatal problem to architectural materials with abstract patterns, and therefore an operation of making a check for the presence of a glitch is executed somewhere in the plate-making process before the making of a press plate for actual printing operation. Hitherto, a proof sheet has been used for the glitch checking operation. It may be considered to use the film for plate-making to check whether or not a glitch is present, as a matter of course. However, since the way in which a glitch occurs varies with colors, it is extremely difficult to make a check for the presence of a glitch surely by using the film for plate-making, which is a black-and-white film. After all, the checking operation must be executed with a proof sheet printed by using a baby plate although it invites an increase in the cost.

The operation of removing a glitch is called retouching, in which the baby plate is remade by remaking the mask, rearranging or rotating the pattern, and repeating the pattern by film composition. However, the retouching operation not only requires a great deal of skill but also involves a heavy work load on the operator. Further, it takes a great deal of time because the whole operation is carried out by manual operation. Consequently, a long time is needed to complete the plate-making process, and thus the cost of plate-making has been high in the prior art.

Moreover, some glitches cannot be removed by the manual retouching operation, and if a glitch is left unremoved, the plan itself may be canceled. In such a case, the plate-making operation which has been done so far will come to naught.

These circumstances similarly accompany the plate-making process that employs a layout scanner. That is, although the steps up to the making of a baby plate pattern are executed automatically, the retouching operation still depends on the manual operation. Therefore, the above-described problems remain unsolved. It is, of course, possible to rotate the material sample pattern, which is read with an input scanner and displayed on the monitor screen, and to repeat it with a proper mask pattern used. However, this operation is basically the same as the manual retouching operation. That is, the optical operation, which is executed by using film, is merely replaced with an operation in which the pattern of the material sample is handled on the monitor by using a pointing device such as a mouse or a stylus pen. The time and labor required in this operation are the same as in the case of the manual retouching operation. In addition, since it is impossible to display on the display screen the whole pattern of the baby plate, which is about 1 m square, as described above, it is impossible to check whether or not the glitch has been successfully removed, even if the retouching operation is carried out on the display screen. In other words, whether or not a glitch will occur cannot be predicted from the pattern of the material sample alone, but the occurrence of a glitch can be confirmed only after a baby plate has been made by repeating the material sample pattern. Accordingly, it is necessary in order to allow checking for the presence of a glitch to enable the whole pattern of the baby plate to be displayed on the monitor screen. However, the monitor of the conventional layout scanner cannot display the whole pattern of the baby plate.

Further, even if the whole pattern of the baby plate can be displayed on the monitor screen, a glitch may occur when a press plate for actual printing operation is made by repeating the pattern of the baby plate despite the fact that no glitch is found on the baby plate. The conventional abstract pattern plate-making system that employs a layout scanner cannot cope with such a situation.

SUMMARY OF THE INVENTION

In view of the above-described problems of the prior art, it is an object of the present invention to provide an abstract pattern plate-making system which is capable of removing a glitch from an abstract pattern, and a glitch-free printed matter, which is obtained by using a press plate made by the plate-making system.

To attain the above-described object, the present invention provides an abstract pattern plate-making system including a means for removing an undesired pattern by dividing endless pattern data into blocks and then repeating processing in which pattern data in two blocks selected at random from among the divided blocks are combined together by a composition technique using mask data having a predetermined pattern.

The mask data may be multi-valued data having gradation, and the composition technique may be dissolve composition. Further, the mask size may be set larger than the size of each of the divided blocks. In such a case, the mask preferably has edges which are defined by smooth curved lines and is shaped so that each pair of adjacent masks engage with each other completely in butt-to-the-line form and in a key-and-keyhole relationship. More preferably, the smooth curved lines are sinusoidal curves. In addition, when the mask size is larger than the block size, pattern data projecting from the endless pattern is moved to an edge at the opposite side of the mask.

Secondly, the present invention provides an abstract pattern plate-making system having a means for removing an undesired pattern by dividing endless pattern data into blocks and then repeating processing in which pattern data in two blocks selected at random from among the divided blocks are replaced with each other or combined together by using mask data having a predetermined pattern, wherein when the endless pattern is divided into blocks, the undesired pattern removing means allots the blocks so that they are offset from the endless pattern, and moves a region of the mask pattern which projects from the endless pattern to a side opposite to the side where it projects.

In the above-described arrangement, the projecting region of the mask pattern may be moved to a position, which directly faces the position where it projects, at a side opposite to the side where the region projects. Alternatively, the projecting region of the mask pattern may be moved to a position, which is offset from the position where it projects by ½ pitch of the endless cycle, at a side opposite to the side where the region projects.

Thirdly, the present invention provides an abstract pattern plate-making system including a first means for preparing mask data on the basis of pattern data at a predetermined position of endless pattern data and for copying pixel data at a predetermined position to another predetermined position on the basis of the mask data, and a second means for dividing the endless pattern data into a predetermined number of blocks and for rearranging the divided blocks.

With the above-described abstract pattern plate-making systems, it is possible to automate the retouching operation, which has heretofore required a great deal of time and labor, and hence possible to remove a glitch, if any, in a short time. In addition, since glitch removal can be carried out on the endless pattern by the scramble scheme or the pixel copy scheme, the effectiveness of glitch removal is remarkably high.

In addition, the present invention provides a printed matter which is obtained by using a press plate that is made on the basis of a pattern obtained by dividing first endless pattern data into blocks, combining pattern data in two blocks selected at random from among the divided blocks by a composition technique using mask data having a predetermined pattern, thereby obtaining a pattern of second pattern data, and then repeating the pattern a predetermined number of times both vertically and horizontally as it is or after trimming it to a predetermined size.

The mask data may be multi-valued data having gradation, and the composition technique may be dissolve composition. Further, the mask size may be set larger than the size of each of the divided blocks. In such a case, the mask preferably has edges which are defined by smooth curved lines and is shaped so that each pair of adjacent masks engage with each other completely in butt-to-the-line form and in a key-and-keyhole relationship. More preferably, the smooth curved lines are sinusoidal curves.

Secondly, the present invention provides a printed matter which is obtained by using a press plate that is made on the basis of a pattern obtained by repeating an endless pattern a predetermined number of times both vertically and horizontally, the endless pattern being obtained by a process in which endless pattern data is divided into blocks, and pattern data in two blocks selected at random from among the divided blocks are replaced with each other or combined together by using mask data having a predetermined pattern, wherein a region of the mask pattern which projects from the endless pattern is moved to a side opposite to the side where it projects, thereby removing an undesired pattern from the endless pattern.

In the above-described arrangement, the projecting region of the mask pattern may be moved to a position, which directly faces the position where it projects, at a side opposite to the side where the region projects. Alternatively, the projecting region of the mask pattern may be moved to a position, which is offset from the position where it projects by ½ pitch of the endless cycle, at a side opposite to the side where the region projects.

Thirdly, the present invention provides a printed matter which is obtained by using a press plate made on the basis of a pattern obtained by repeating an endless pattern a predetermined number of times both vertically and horizontally, the endless pattern being obtained by carrying out predetermined image processing with an abstract pattern plate-making system having a first means for preparing mask data on the basis of pattern data at a predetermined position of endless pattern data and for copying pixel data at a predetermined position to another predetermined position on the basis of the mask data, and a second means for dividing the endless pattern data into a predetermined number of blocks and for rearranging the divided blocks.

With the above-described arrangements, glitch-free abstract pattern printed matters can be obtained.

BRIEF DESCRIPTION OF THE DRAWINGS

FIG. 4 shows one example of the arrangement of a scramble processing part;

FIGS. 5A–5E show examples of masks used for replacement of pixels in blocks during scramble processing;

FIG. 6 shows one example of a gray scale mask used during a batch mode;

FIGS. 7A and 7B illustrate a scramble table;

FIG. 8 illustrates block replacement during a display mode;

FIG. 9 shows exemplarily the contents of the scramble table at the time of completion of the display mode;

FIG. 10 shows one example of the arrangement for combining two block images by dissolve composition;

FIG. 11 shows one example of the arrangement of a pixel block combining part;

FIGS. 12A and 12B comprise views for explanation of the operation of the pixel block combining part;

FIGS. 13A and 13B comprise views for explanation of the operation of the pixel block combining part;

FIGS. 14A and 14B comprise views for explanation of the operation of the pixel block combining part;

FIG. 15 is a view for explanation of the operation of the pixel block combining part;

FIGS. 33A–33F show modes of endless pattern;

FIGS. 34A and 34B show endless pattern repeat modes which may be employed for making a baby plate;

DESCRIPTION OF THE PREFERRED EMBODIMENTS

Embodiments of the present invention will be described below with reference to the accompanying drawings.

Figure 1:
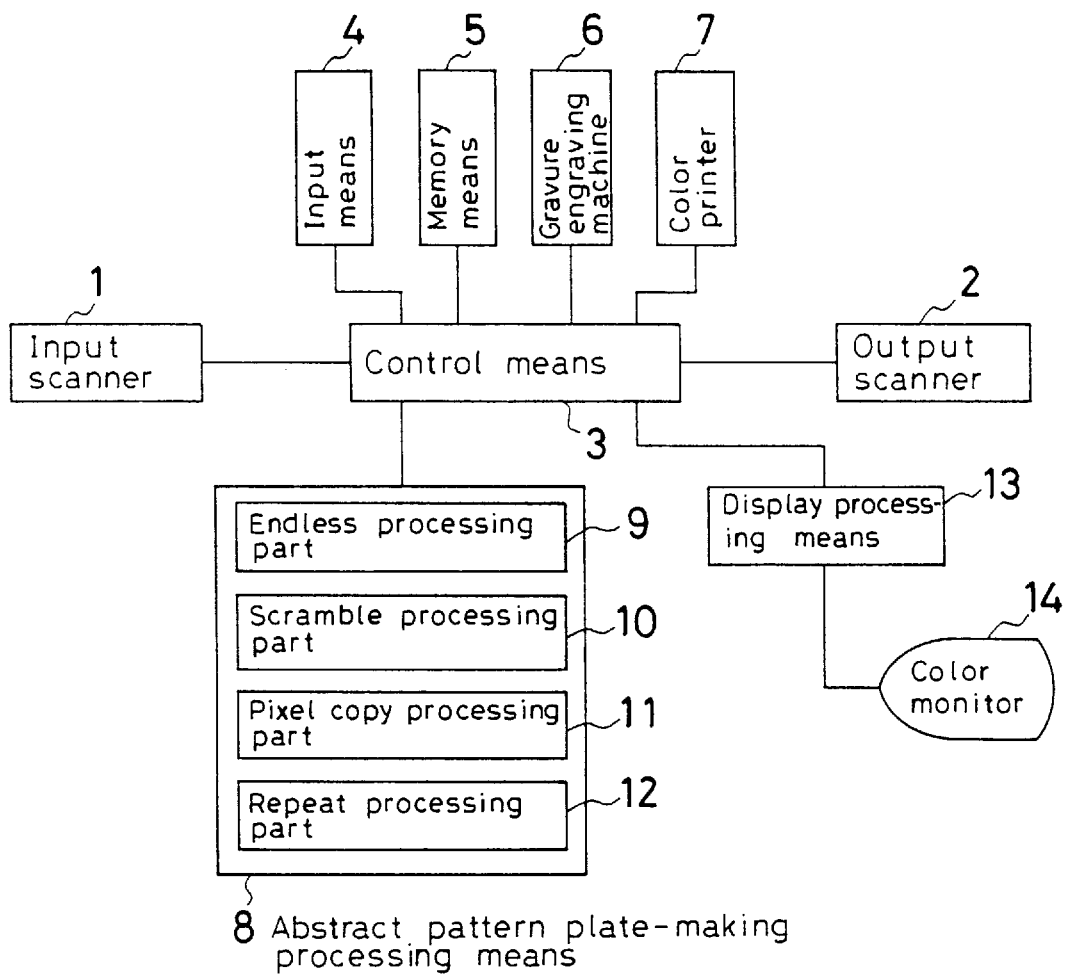
FIG. 1 shows the arrangement of one embodiment of the abstract pattern plate-making system for architectural material printing according to the present invention.

FIG. 1 shows the arrangement of one embodiment of the abstract pattern plate-making system according to the present invention. In the figure, reference numeral 1 denotes an input scanner, 2 an output scanner, 3 a control means, 4 an input means, 5 a memory means, 6 a gravure engraving machine, 7 a color printer, 8 an abstract pattern plate-making processing means, 9 an endless processing part, 10 a scramble processing part, 11 a pixel copy processing part, 12 a repeat processing part, 13 a display processing means, and 14 a color monitor.

First, each part will be explained briefly. The input scanner 1 scans a color film obtained by photographing a material sample and separates pixels into four colors, i.e., cyan (C), magenta (M), yellow (Y), and black (K), and then delivers an output in the form of digital image data of a predetermined number of bits, e.g., 8 bits. The arrangement of the input scanner 1 is the same as that of an input scanner employed in the conventional layout scanner.

The output scanner 2 outputs a plurality of progressive data in the form of film. The arrangement of the output scanner 2 is the same as that of an output scanner employed in the conventional layout scanner.

The control means 3 effects general control of the operation of the abstract pattern plate-making system according to the present invention.

The input means 4 comprises an input unit, e.g., a keyboard, a pointing device, etc.

The memory means 5 comprises a storage unit, e.g., a RAM and/or a hard disk.

The gravure engraving machine 6 engraves a baby plate and a press plate for actual printing operation.

The color printer 7 comprises a sublimation transfer printer, an ink-jet printer, etc., which can output at least a color hard copy of the baby plate size, more preferably, a color hard copy of the running-on plate size.

The abstract pattern plate-making processing means 8 has the endless processing part 9, the scramble processing part 10, the pixel copy processing part 11, and the repeat processing part 12. The operations of these parts will be explained later.

The display processing means 13 effects display control of the color monitor 14 and has a video RAM with a predetermined capacity corresponding to the number of pixels of the color monitor 14.

The color monitor 14 comprises a display unit, e.g., a color CRT. The color monitor 14 is preferably a high-definition display unit.

Next, the operation of the abstract pattern plate-making system, shown in FIG. 1, will be explained with reference to FIG. 2, which is a flowchart showing an example of a plate-making and printing process that is executed by using the abstract pattern plate-making system.

First, when a unit material, which is the smallest repeating unit of abstract pattern, is delivered to the plate-making process, the unit material is set on the input scanner 1 to read image data from the unit material (Step S1). It should be noted that when the unit material is a film, it is set on the input scanner 1 as it is, but when the unit material is a material other than a film, e.g., a design, it is temporarily photographed with a color film for reading, or, if necessary, the unit material is photographed with a process camera to make separation films for reading. The image data read from the unit material in this way is stored in the memory means 5.

Next, when an endless processing instruction is given through the input means 4, the control means 3 activates the endless processing part 9 in the abstract pattern plate-making processing means 8 to execute endless processing (Step S2).

The term "endless processing" is employed herein to mean processing in which pattern data with an area size which is about 4 or 9 times that of the unit material is prepared by combining each pair of vertically adjacent unit materials by dissolve composition with the unit material properly masked (the pattern that is obtained by the endless processing will hereinafter be referred to as "endless pattern"). Image data for a baby plate is prepared simply by repeating the endless pattern data a predetermined number of times. In other words, the endless pattern is intermediate between the unit material and the baby plate, and it enables the work load on the operator to be reduced by a large margin. That is, it has been conventional practice to repeat a unit material while properly subjecting it to masking treatment to thereby make a baby plate directly. With the conventional practice, however, it takes a great deal of time and labor to make a baby plate because the unit material is about 3 cm to 5 cm square and the baby plate is about 1 m square, as has been described above. In contrast, the endless pattern can be made by repeating the unit material about 9 times at most although it needs masking treatment. Moreover, the composition process is carried out automatically. In addition, the baby plate can be made simply by repeating the endless pattern, made in this way, without masking treatment. Therefore, the work load is reduced by a large margin as compared with that in the conventional practice.

Figure 3A:
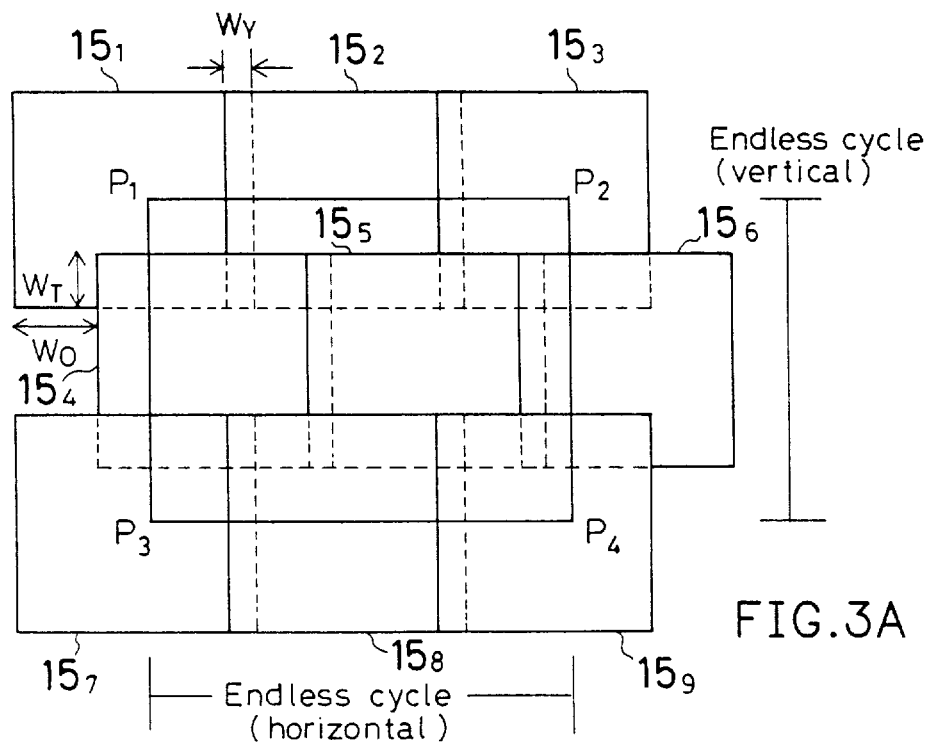
FIGS. 3A–3C comprise views for explanation of dissolve composition carried out to make an endless pattern.
Figure 3B:
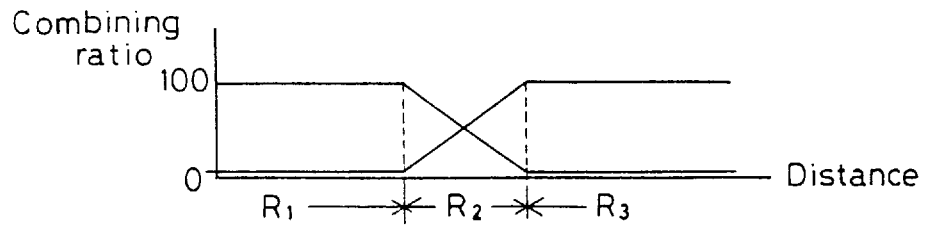
Figure 3C:
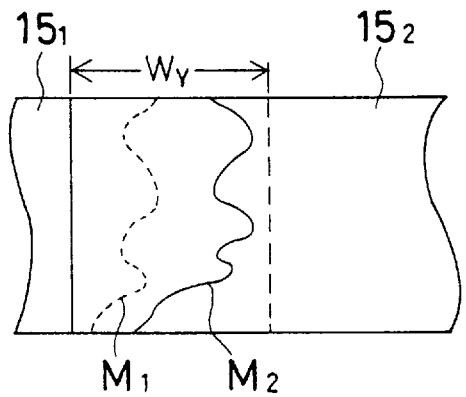

Next, the endless processing will be explained in detail with reference to FIG. 3. Assuming that instructions are given to make an endless pattern by repeating a unit material three times in each of the horizontal and vertical directions, the endless processing part 9 repeats the unit material three times horizontally and also three times vertically. At this time, for horizontal combining, each pair of adjacent unit materials are made to overlap each other with a width $W_Y$, whereas for vertical combining, each pair of adjacent unit materials are made to overlap each other with a width $W_T$, and the second row of unit materials is shifted horizontally by $W_O$, as shown at A in FIG. 3. Then, in each of the horizontal and vertical overlap regions, dissolve composition is carried out in the proportions as shown in the region $R_2$ at B in FIG. 3. For example, when the unit materials $15_1$ and $15_2$ are to be combined by dissolve composition, in the region $R_1$, shown at B in FIG. 3, the pattern of the unit material $15_1$ is 100%, but in the region $R_2$, the pattern of the unit material $15_1$ decreases linearly to 0%, whereas the pattern of the unit material $15_2$ increases linearly to 100%. In the region $R_3$, the pattern of the unit material $15_2$ is 100%. The same is the case with the vertical combining process.

Thus, the unit materials can be combined automatically. However, the automatic combining process is not suitable when it is predicted that an edge will occur at the overlap region of a pair of adjacent unit materials, or when it is predicted that a pattern with a relatively large area which is present in the overlap region will be destroyed by the combining process. For this reason, the endless processing part 9 has, in addition to the automatic combining mode, a mode in which masks for combining process can be set as desired. In the latter mode, it is possible to set two masks $M_1$ and $M_2$ in the horizontal overlap region, as shown at C in FIG. 3, and execute dissolve composition in the region that is sandwiched between these two masks in the proportions as shown in the region $R_2$ at B in FIG. 3. The same is the case with the vertical combining process. However, for the vertical combining process, masks are set separately from those for the horizontal combining process, as a matter of course.

It should be noted that the horizontal overlap width $W_Y$, the vertical overlap width $W_T$ and the shift quantity $W_O$ for the second row may be preset as fixed values in the endless processing part 9. Alternatively, these values may be set each time by the operator through the input means 4. Setting of two mask patterns may be made, for example, by displaying the patterns in the horizontal overlap region and those in the vertical overlap region on the color monitor 14, and tracing the mask lines with a mouse or a stylus pen, and taking in the traced pattern data as mask pattern data. The masks set for the horizontal combining process are used mutually for the combining process in the horizontal direction, while the masks set for the vertical combining process are used mutually for the combining process in the vertical direction.

Upon completion of the above-described combining of unit materials, the endless processing part 9 displays the results of the combining process on the color monitor 14. Then, if an arbitrary point $P_1$ (see A in FIG. 3) on the unit material $15_1$ lying in the top left corner is designated, for example, the endless processing part 9 obtains coordinate values on the composite pattern which respectively correspond to points $P_2$, $P_3$ and $P_4$ having the same address as that of the designated point $P_1$ on the respective units materials, that is, the unit material $15_3$ in the top right corner of the composite pattern, the unit material $15_7$ in the bottom left corner, and the unit material $15_9$ in the bottom right corner. Then, the endless processing part 9 cuts out a rectangle that is determined by these four points $P_1$, $P_2$, $P_3$ and $P_4$, and registers it as an endless pattern, which is stored in a predetermined region in the memory means 5.

The reason why the endless pattern is cut out in the way described above is to prevent occurrence of an edge when a baby plate is made. That is, the baby plate is made simply by repeating the endless pattern, as described later. Therefore, if the endless pattern is cut out in the above-described way, the patterns at both sides of the imaginary straight line connecting the two points $P_1$ and $P_2$, as shown at A in FIG. 3, are the same as the patterns at both sides of the imaginary straight line connecting the two points $P_3$ and $P_4$. Accordingly, no edge occurs even if the endless pattern is repeated in the vertical direction. The same is the case with the horizontal direction. This is the reason why the rectangular pattern is called "endless pattern".

Figure 2:
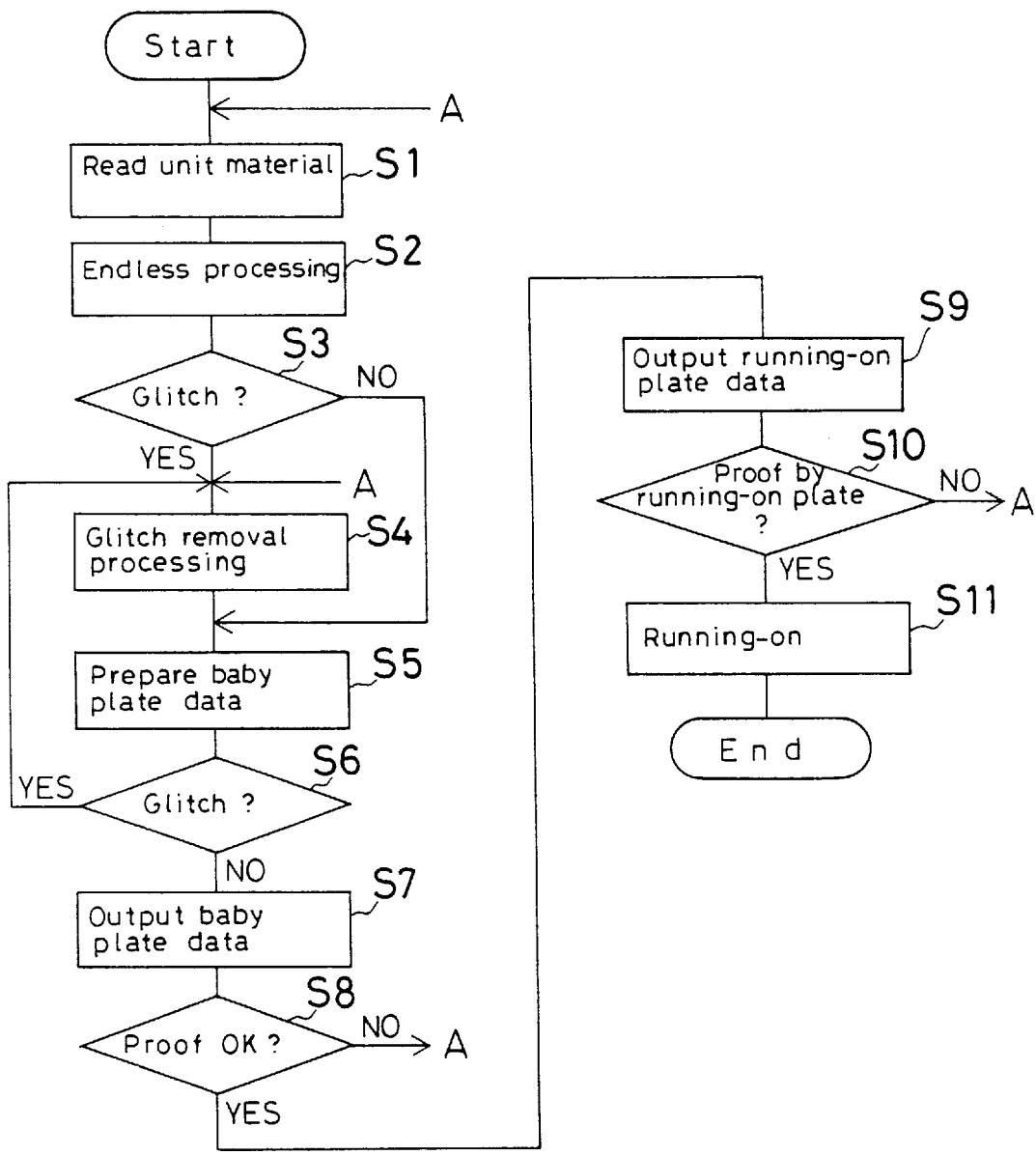
FIG. 2 shows one example of a plate-making process carried out by using the abstract pattern plate-making system for architectural material printing according to the present invention.

The foregoing is the processing carried out at Step S2, shown in FIG. 2. Thus, by making a pattern which is intermediate between a unit material and a baby plate, the work load can be reduced by a large margin as compared to that in the conventional practice.

Upon completion of the endless processing, it is judged whether or not the endless pattern has a glitch (Step S3). The judgement can be made, for example, by repeating the endless pattern data, prepared as described above, a predetermined number of times both vertically and horizontally, and outputting the resulting pattern data through the color printer 7, and then observing the color hard copy thus obtained.

When it is confirmed that there is no glitch, data for a baby plate is prepared (Step S5). If a glitch is found, it is removed (Step S4). For this purpose, the abstract pattern plate-making system, shown in FIG. 1, has the scramble processing part 10 and the pixel copy processing part 11. The scramble processing part 10 removes a glitch by a method wherein a pattern that is at a predetermined address in the endless pattern is replaced with a pattern at another address on the basis of a predetermined mask pattern (this method will hereinafter be referred to as "scramble scheme"). The pixel copy processing part 11 removes a glitch by a method wherein a predetermined pattern is moved to another desired position or rotated as desired on the basis of a predetermined mask pattern (this method will hereinafter be referred to as "pixel copy scheme").

First, the operation of the scramble processing part 10 will be explained. The scramble scheme is suitable for removing a glitch from abstract patterns having fine patterns such as sand pattern, ground tints, etc. The scramble processing part 10 is arranged as shown in FIG. 4 and has a display mode in which glitch removal is simulated, and a batch mode in which glitch removal processing is actually executed. The scramble processing includes three modes, as described below: a mode in which scramble processing is executed by using a mask smaller than the block size; a mode in which blocks which are to be subjected to pixel replacement or dissolve composition are allotted so as to be offset from the endless pattern; and a mode in which scramble processing is executed by using a mask larger than the block size. The mode in which scramble processing is executed by using a mask smaller than the block size will first be explained.

The scramble processing part 10 is activated when the mode in which scramble processing is executed by using a mask smaller than the block size is designated from the input means 4. First, the display mode is activated.

The display mode is a mode for checking by simulation whether or not the glitch concerned can be removed effectively by scramble processing. First, in order to complete the simulation in a short time, the endless pattern image data stored in the memory means 5 is thinned out so that the number of pixels is below about 2k pixels×2k pixels, and the resulting image data is spread in a frame memory 22 and also sent to the display processing means 13 to display the image on the color monitor 14. Then, the pixels of the endless pattern that are left after the thinning out of the image data are divided into blocks of a predetermined size, e.g., a size of about 200 pixels×200 pixels. The block size may be fixed. Alternatively, it may be variable so that the operator can set a desired block size.

A random address generating part 24 is given a number of times of execution of pixel block replacement, which is designated by the operator through the input means 4. By generating random numbers, the random address generating part 24 generates a number of pairs of addresses, each pair designating two different pixel blocks, and the number corresponding to the number of times of execution. Then, the random address generating part 24 sends the address pairs to a pixel block transfer part 23.

A mask data part 25 has mask patterns registered therewith, which include binary mask patterns of various shapes, which are used during the display mode, such as those shown at A to E in FIG. 5, and gray scale mask patterns, used during the batch mode, which correspond to the binary mask patterns. FIG. 6 shows an example of the gray scale mask pattern corresponding to the binary mask pattern that is shown at E in FIG. 5. Small blocks in the mask pattern shown in FIG. 6 respectively represent pixels of the mask pattern. For each pixel, a coefficient $\alpha$ used during the execution of dissolve composition, described later, has been set in advance. In the example shown in FIG. 6, $\alpha=0$ is set for the outermost pixels, which are shown by white, and $\alpha=1$ is set for the central pixels, which are painted over with stipping to represent black. For the pixels in between the white and black pixels, coefficients of a proper value between 0 and 1 are set. The same is the case with other gray scale masks.

Although in this embodiment the mask data part 25 has two pieces of pattern data for one mask pattern, i.e., binary mask pattern data and gray scale mask pattern data, the arrangement may be such that only binary mask pattern data is prepared, and when processing is to be executed in the batch mode, the binary mask pattern used during the display mode is shifted with a predetermined width a predetermined number of times in the vertical and/or horizontal direction, thereby automatically generating a gray scale mask pattern.

When the display mode is activated, the mask data part 25 calls the binary mask pattern of the designated shape from the registered mask patterns and sends it to the pixel block transfer part 23. The pixel block transfer part 23 fetches pixel data on blocks which are located at a pair of pixel block addresses $AD_1$ and $AD_2$ generated in the random address generating part 24, and replaces the pixels in these blocks with each other according to the mask pattern sent from the mask data part 25. Thus, the pixels inside the mask pattern in the block at the address $AD_2$ are written inside the mask pattern in the block at the address $AD_1$, while the pixels inside the mask pattern in the block at the address $AD_1$ are written inside the mask pattern in the block at the address $AD_2$. At this time, the pixel block transfer part 23 writes in a scramble table 26 the result of the replacement, that is, how pixels in one block have been replaced with pixels in another. Assuming, for example, that an endless pattern is divided into 16 blocks and No. 6 block and No. 15 block have been replaced with each other by the first block replacement, as shown at A in FIG. 7, the pixel block transfer part 23 rewrites the scramble table 26, which is initially in the state shown at A in FIG. 7, to that shown at B in FIG. 7.

The pixel block transfer part 23 repeats the above-described operation the designated number of times. For example, it is assumed that the thinned-out endless pattern 30 is divided into 72 blocks, i.e., 9 (horizontally)×8 (vertically), as shown in FIG. 8, and the mask pattern of the shape that is shown at A in FIG. 5 is selected. Then, if the random address generating part 24 generates a pair of addresses $BL_1$ and $BL_2$ for the first replacement, the pixel block transfer part 23 takes in the pixels in the blocks whose addresses are $BL_1$ and $BL_2$, respectively, and replaces the pixels included in the circular masks with each other. Next, if a pair of addresses $BL_3$ and $BL_4$ are generated for the second replacement, the pixel block transfer part 23 takes in the pixels in the blocks whose addresses are $BL_3$ and $BL_4$, respectively, and replaces the pixels included in the circular masks with each other. In this way, the operation is repeated the designated number of times.

After executing the replacement of pixels in blocks the designated number of times, the pixel block transfer part 23 transfers the image data on the frame memory 22 to the display processing means 13. Thus, the image that has been subjected to the scramble processing is displayed on the color monitor 14, so that the operator can check on the color monitor 14 whether or not the glitch has been removed. When it is judged that the glitch has been removed, the operator finishes the display mode and designates execution of the batch mode. If it is judged that the glitch has not yet been removed, the operator inputs a number of times of execution to execute the above-described operation successively until the glitch is removed successfully.

Upon completion of the display mode, the mask shape data used is stored in a predetermined file, and data showing which blocks have been finally shifted to which block positions is written on the scramble table 26. FIG. 9 shows one example of this. According to FIG. 9, No. 8 block has been finally shifted to No. 1 block position, and No. 4 block has been finally shifted to No. 2 block position. The other blocks have been similarly shifted, too.

Next, the operation that is carried out during the batch mode will be explained. During the batch mode, image data on the original endless pattern is transferred from the memory means 5 to the image memory 20 as it is, and the scramble table is transferred from the scramble table 26 to the pixel block combining part 21. In addition, the gray scale mask pattern of the same shape as that of the mask pattern used during the display mode is transferred from the mask data part 25 to the pixel block combining part 21. Then, the pixel block combining part 21 combines the images of two blocks by dissolve composition on the basis of the scramble table. Assuming, for example, that the scramble table is such as that shown in FIG. 9, the pixel block combining part 21 puts the image of No. 8 block to No. 1 block and the image of No. 4 block to No. 2 block by dissolve composition according to the coefficients α of the gray scale mask pattern. More specifically, when the images of Nos. 1 and 8 blocks are combined by dissolve composition using a predetermined gray scale mask, the pixel block combining part 21 performs the following calculation for each of the corresponding pixels in regard to each of the images of C, M, Y and K:

$$C = \alpha \times C_8 + (1-\alpha) \times C_1$$

$$M = \alpha \times M_8 + (1-\alpha) \times M_1$$

$$Y = \alpha \times Y_8 + (1-\alpha) \times Y_1$$

$$K = \alpha \times K_8 + (1-\alpha) \times K_1$$

where $0 \leq \alpha \leq 1$, and $C_8$ and $C_1$ represent the pixel values of the original Nos. 8 and 1 blocks, respectively.

The endless pattern image data composed in this way is written into the memory means 5. It should be noted that the image size is reduced during the display mode, whereas the image that is subjected to processing during the batch mode is the original image. Therefore, the size of the gray scale mask pattern used during the batch mode is made larger than the size of the binary mask pattern used during the display mode by an amount corresponding to the reduction ratio, as a matter of course.

The following is the reason why in the display mode pixels are merely replaced by using a binary mask, whereas in the batch mode the images of two blocks are combined by dissolve composition using a gray scale mask. That is, since the display mode is carried out only for checking whether or not the glitch concerned can be removed, high processing speed is desired. Therefore, a binary mask, which can be processed easily, is employed. However, since the batch mode is a mode in which the endless pattern is actually corrected, if a binary mask is used for the replacement, a gradation gap is unavoidably produced in the image at the boundary of the mask patterns, and the continuity of the pattern may be lost. Therefore, the use of a binary mask for the batch mode is undesirable. Accordingly, during the batch mode dissolve composition is carried out using a gray scale mask, thereby canceling the gradation gap in the image and maintaining the continuity of the pattern.

To combine the images of two blocks by dissolve composition, various arrangements may be considered. For example, it may be considered to adopt a method wherein two image memories are provided, and the image of a predetermined block in one image memory and the image of a predetermined block in the other are combined together according to the coefficients α of the gray scale mask, thereby forming a composite image. More specifically, as shown in FIG. 10, two image memories $20_1$ and $20_2$ are provided, and image data on the endless pattern is transferred to both of them in advance. Assuming that the contents of the scramble table 26 are such as those shown in FIG. 9, the image data on No. 1 block is fetched from one image memory, for example, the image memory $20_1$ while the image data on No. 8 block is fetched from the other image memory $20_2$, and the above-described calculation is performed according to the coefficients α of the gray scale mask. Thus, the resulting image data is written into either of the image memories.

However, this method requires the image memories to have an exceedingly large memory capacity, resulting in a rise in the cost of the system concerned. Therefore, the pixel block combining part 21 in this embodiment has two image buffer memories $IB_1$ and $IB_2$, and an address buffer memory AB, as shown in FIG. 11, and executes the following processing. It should be noted that the image buffer memories $IB_1$ and $IB_2$ each have a capacity which is sufficiently large to store image data on one block.

First, the pixel block combining part 21 searches the scramble table for a numeral other than 0 from the top left and writes the address, where a numeral other than 0 has been written, into the address buffer memory AB. Assuming that the contents of the scramble table are such as those shown in FIG. 9, the pixel block combining part 21 first writes "1" in the address buffer memory AB. Then, the pixel block combining part 21 reads from the image memory 20 the image data on a block having the same numeral as that written at the address concerned, i.e., in this case, the image data on No. 8 block in the initial state, and copies it into one image buffer memory, for example, the image buffer memory IB$_1$. Further, the pixel block combining part 21 reads the image data on a block having the same numeral as that written in the address buffer memory AB, i.e., the image data on No. 1 block in this case, and copies it into the other image buffer memory, for example, the image buffer memory IB$_2$. In addition, since the data at the address 1 on the scramble table has already been read, the pixel block combining part 21 writes 0 at the address 1 to clear it. The condition is shown in FIG. 12. It should be noted that in FIG. 12, ST denotes a scramble table, and B1 and B8 denote the image data on Nos. 1 and 8 blocks, respectively, in the initial state. The same rule applies in the following description.

Next, the pixel block combining part 21 combines together the image data written in the image buffer memory IB$_1$, i.e., the image data on No. 8 block in this case, and the image data written in the image buffer memory IB$_2$, i.e., the image data on No. 1 block in this case, by dissolve composition by referring to the coefficients α of the gray scale mask pattern sent from the mask data part 25. Then, the pixel block combining part 21 writes the result into the block having the same value as that written in the address buffer memory AB, i.e., No. 1 block in this case, and clears the image buffer memory IB$_1$. Thus, the composite image data, which is formed by combining together the images of Nos. 1 and 8 blocks by dissolve composition, is written into No. 1 block of the image memory 20.

Next, the pixel block combining part 21 searches the scramble table for an address where the same numeral as that written in the address buffer memory AB has been written, and writes the value of the address into the address buffer memory AB. Further, the pixel block combining part 21 writes 0 at the address concerned to clear it. In addition, the pixel block combining part 21 reads from the image memory 20 the image data on the block having the same value as that of the address concerned and copies it into the image buffer memory cleared in the preceding process. In this case, since "1" has already been written at the address 7 on the scramble table, the pixel block combining part 21 writes "7" into the address buffer memory AB and copies the image data of No. 7 block, which is read from the image memory 20, into the image buffer memory IB$_1$, as shown at A in FIG. 13. Further, the pixel block combining part 21 clears the address 7 on the scramble table ST, as shown at B in FIG. 13.

Next, the pixel block combining part 21 combines together the image data written in the image buffer memory IB$_2$, i.e., the image data on No. 1 in this case, and the image data written in the image buffer memory IB$_1$, i.e., the image data on No. 7 block in this case, by dissolve composition by referring to the coefficients α of the gray scale mask pattern. Then, the pixel block combining part 21 writes the result into a block having the same value as that written in the address buffer memory AB, i.e, No. 7 in this case, and clears the image buffer memory IB$_2$. Thus, the composite image data, which is formed by combining together the images of Nos. 7 and 1 blocks by dissolve composition, is written into No. 7 block in the image memory 20.

Next, the pixel block combining part 21 searches the scramble table ST for an address where the same numeral as that written in the address buffer memory AB, i.e., "7" in this case, has been written, and writes the value of the address, i.e., "11" in this case, into the address buffer memory AB. Further, the pixel block combining part 21 writes 0 at the address 11 on the scramble table ST to clear it. In addition, the pixel block combining part 21 reads from the image memory 20 the image data on a block having the same value as that of the address concerned, and copies it into the image buffer memory cleared in the preceding process, i.e., the image buffer memory IB$_2$. Accordingly, in this case the contents of the image buffer memories IB$_1$ and IB$_2$ and the address buffer memory AB are such as those shown at A in FIG. 14, and the contents of the scramble table ST are such as those shown at B in FIG. 14.

In this way, the pixel block combining part 21 executes the above-described processing repeatedly until all the addresses on the scramble table ST are cleared. However, in a case where the contents of the scramble table ST are such as those shown in FIG. 9, when the processing for 7→11→12→3→15→10→6→8 has been executed, the contents of the scramble table ST become such as those shown in FIG. 15. Accordingly, it becomes impossible to search for "8". In such a case, the pixel block combining part 21 suspends the processing, and it searches the scramble table ST for a numeral other than 0 from the top left again and writes into the address buffer memory AB an address where a numeral other than 0 has been written. Then, the pixel block combining part 21 executes the above-described processing.

The image data on the endless pattern, which has got rid of the glitch, is registered at a predetermined file of the memory means 5.

Although in the foregoing description only one mask pattern is used, it should be noted that a mask pattern used may be changed for each combining process by generating random numbers, for example. Further, in the foregoing embodiment, during the display mode the image is displayed on the color monitor 14 after the pixel replacement has been executed the designated number of times. However, the arrangement may be such that no number of times of execution is designated, but the image is displayed every 100-th execution of the pixel replacement, for example, and when the operator judges that the glitch has been removed, the replacement operation is forcibly stopped.

In the foregoing, the scramble processing, in which a mask smaller than the block size is used, has been explained. The following is a description of scramble processing wherein blocks which are to be subjected to the pixel replacement or dissolve composition are allotted so as to be offset from the endless pattern.

The mode, in which blocks which are to be subjected to pixel replacement or dissolve composition are allotted so as to be offset from the endless pattern to thereby remove a glitch, is activated in the mode where a mask smaller than the block size is used. Before the description of this mode, the significance of providing such a mode will be explained.

Figure 16:
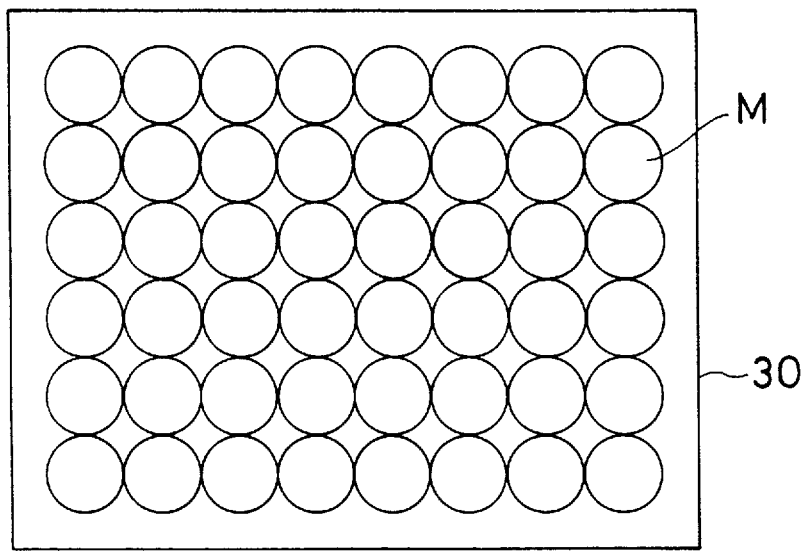
FIG. 16 is a view for explanation of one example of allotment of mask patterns to an endless pattern.

For example, when a circular mask pattern such as that shown at A in FIG. 5 is used, the edge portions of the endless pattern 30 are out of the range of the mask M and hence out of the objective range of the glitch removal processing, as shown in FIG. 16. It should be noted that FIG. 16 illustrates an extreme case. However, when glitch removal is actually carried out by the scramble scheme, the edge portions of the endless pattern 30 are important portions to keep the continuity of the pattern with the adjacent endless pattern when the pattern is repeated to make a baby plate, as described later. Therefore, there are cases where only the central portion of the endless pattern 30 is divided into blocks, without allotting any block in the edge portions thereof, as shown in FIG. 16.

In such a case, however, when the endless pattern 30 is repeated to make a baby plate, the repeating pattern of the edge portions, which are not subjected to glitch removal processing, becomes tangible, so that a new glitch may occur.

Figure 17:
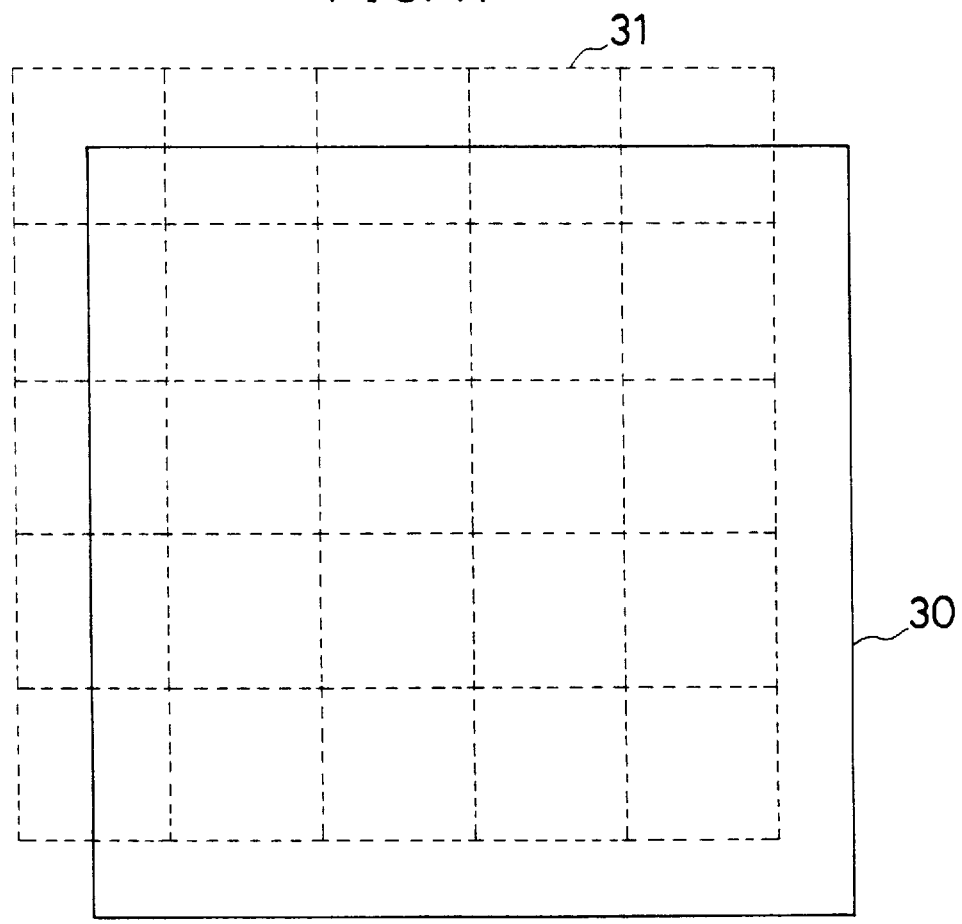
FIG. 17 is a view for explanation of allotment of mask patterns to an endless pattern.

Therefore, when this mode is designated, the pixel block transfer part 23, when dividing the endless pattern into blocks, does not allot the blocks from the edge portions of the endless pattern, as shown in FIG. 8, but allot them so that they are offset from the endless pattern. Assuming, for example, that the endless pattern is divided into 5×5 blocks, the blocks are allotted so as to be offset from the endless pattern 30, as denoted by reference numeral 31 in FIG. 17. Then, the portion of a block that projects from the endless pattern 30 is moved to a side opposite to the side where it projects.

More specifically, block portions that project from the endless pattern may be moved to the opposite sides in six different ways, as shown at A to F in FIG. 18.

Figure 18A:
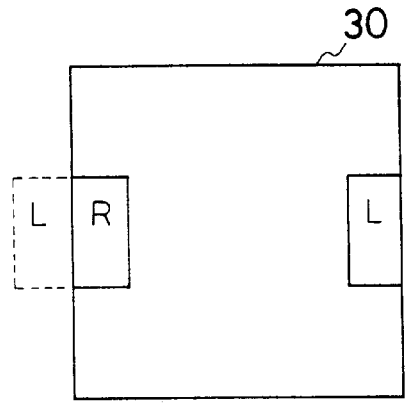
FIGS. 18A–18F comprise views for explanation of a mode of moving projecting blocks.
Figure 18B:
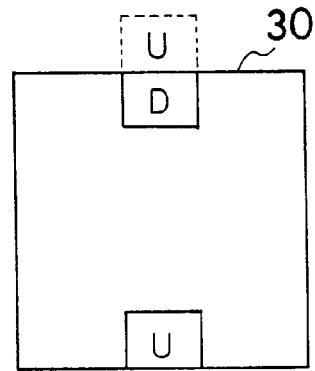

FIGS. 18A and 18B show modes of moving projecting portions of blocks, which are used when blocks project from the endless pattern 30 in the horizontal and vertical directions, respectively. Projecting portions L and U, which are shown by the chain lines, are moved to the corresponding positions at respective sides opposite to the sides where they project, as shown by L and U surrounded with the solid lines.

Figure 18C:
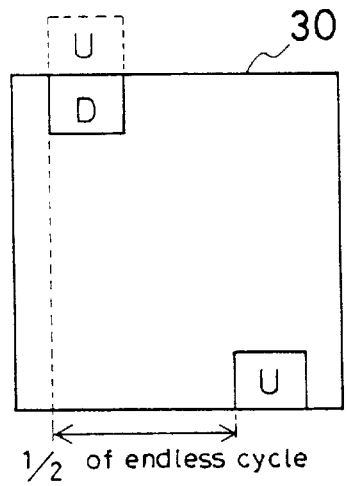

FIG. 18C shows one mode of moving, which is used when a block projects from the endless pattern 30 in the vertical direction. A projecting portion U, shown by the chain line, is shifted by ½ of the endless cycle and moved to the lower side as viewed in the figure, that is, a side opposite to the side where it projects.

Figure 18D:
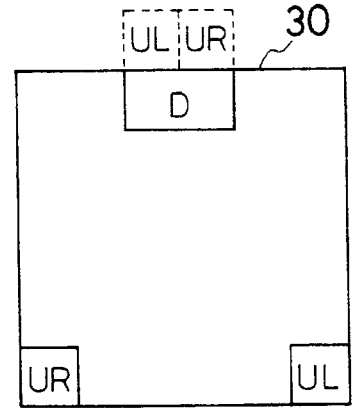

FIG. 18D shows one mode of moving, which is used when a block projects from the endless pattern 30 in the vertical direction. A projecting portion, shown by the chain line, is subdivided into two regions UL and UR, which are shifted by ½ of the endless cycle and moved to the respectively corresponding positions at the opposite side.

Figure 18E:
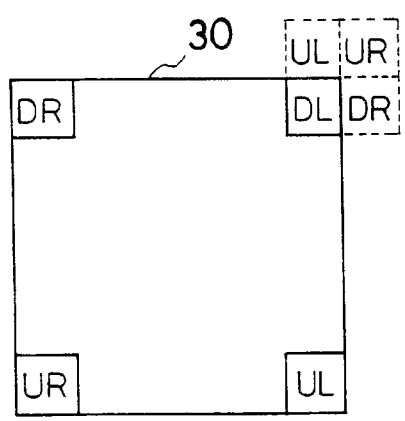

FIG. 18E shows one mode of moving, which is used when a block projects at a corner of the endless pattern 30. A projecting portion, shown by the chain line, is subdivided into three regions UL, UR and DR. The regions DR and UL are moved to the corresponding positions at sides opposite to the sides where they project, while the region UR is moved to the diagonally opposite position.

Figure 18F:
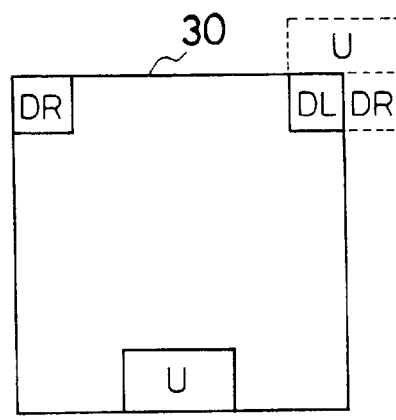

FIG. 18F shows one mode of moving, which is used when a block projects at a corner of the endless pattern 30. A projecting portion, shown by the chain line, is subdivided into two regions U and DR. The region U is shifted by ½ of the endless cycle and moved to the opposite side, while the region DR is moved to the corresponding position at the opposite side.

Which one of the six moving methods, shown at A to F in FIG. 18, is to be actually used to move a portion projecting from the endless pattern is automatically determined according to the way in which the endless pattern is repeated to make a baby plate afterward. More specifically, a baby plate is made by repeating the endless pattern a predetermined number of times in both the vertical and horizontal directions, as described later. For this process, there are two modes: one in which the endless pattern is repeated regularly in both the vertical and horizontal directions, as shown at A in FIG. 34; and another mode in which the endless pattern is repeated so that the patterns are staggered by ½ of the endless cycle, as shown at B in FIG. 34. Which mode is to be used to make a baby plate is designated by the operator when the endless processing, at Step S2 in FIG. 2, is executed, prior to the glitch removal processing concerned. Accordingly, the pixel block transfer part 23 determines which is to be used among the moving methods, shown at A to F in FIG. 18, according to the endless pattern repeat mode designated by the operator for making a baby plate.

More specifically, when the repeat mode that is shown at A in FIG. 34 is designated for making a baby plate, the pixel block transfer part 23 moves the projecting portion by one selected from among the methods that are shown at A, B and E in FIG. 18, whereas, when the repeat mode that is shown at B in FIG. 34 is designated for making a baby plate, the pixel block transfer part 23 moves the projecting portion by one selected from among the methods that are shown at A, C, D and F in FIG. 18.

Figure 19:
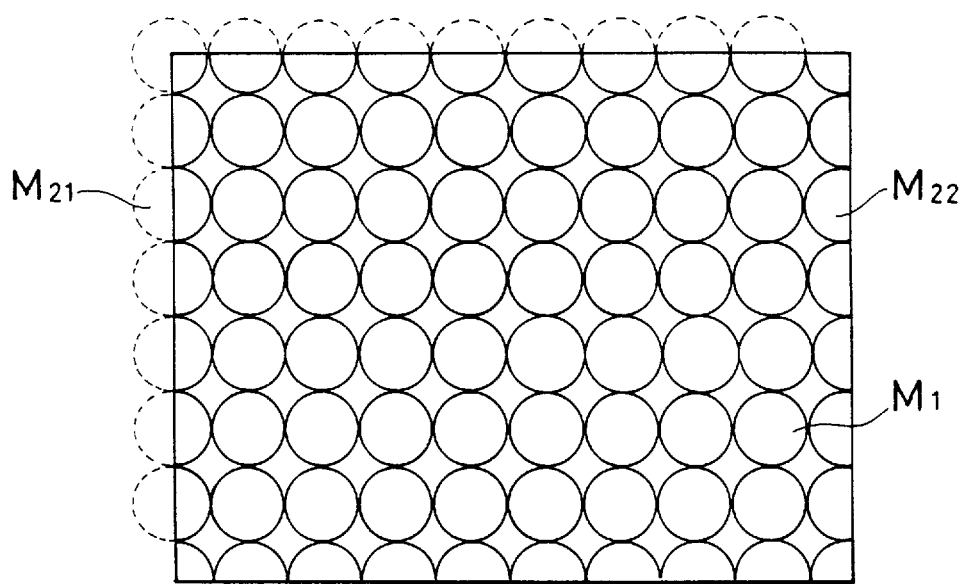
FIG. 19 shows one example of allotment of mask patterns to an endless pattern.

Thus, the pixel block transfer part 23 moves portions projecting from the endless pattern to the opposite sides by referring to the endless pattern repeat mode selected by the operator for making a baby plate, thereby allotting the blocks to the whole area of the endless pattern, and allots the mask pattern to the blocks allotted by the above-described moving process by dividing it for each block, and then executes pixel replacement. Assuming, for example, that the repeat mode that is shown at A in FIG. 34 is selected as an endless pattern repeat mode for making a baby plate and a circular mask pattern is selected as a mask pattern, the pixel block transfer part 23 adopts the moving mode that is shown at E in FIG. 18 for a projecting portion at a corner of the endless pattern, and the moving modes that are shown at A and B in FIG. 18 for leftward and upward projecting portions, respectively, thereby moving the projecting portions to the opposite sides, and then executes pixel replacement by referring to the mask pattern. As a result, the mask pattern corresponds to the endless pattern, as shown in FIG. 19. It should be noted that in FIG. 19 the chain lines show portions of the mask pattern which project from the endless pattern. In FIG. 19, when the image data on the mask region that is shown by $M_1$ is to be replaced with the image data on the mask region that is divided into $M_{21}$ and $M_{22}$, the pixel block transfer part 23 fetches the image data on the mask region $M_1$ from the corresponding address in the frame memory 22 and further fetches the image data on the mask regions $M_{21}$ and $M_{22}$ from the corresponding addresses and then combines together the image data. The pixel block transfer part 23 transfers the resulting composite image data to the address of the mask region $M_1$ in the frame memory 22 and overwrites it there. Further, the pixel block transfer part 23 divides the image data on the mask region $M_1$ into two and transfers them to the respective addresses of the mask regions $M_{21}$ and $M_{22}$ and overwrites them there.

By the above-described processing, the glitch removal by the scramble scheme can be carried out even for the edge portions of the endless pattern. Thus, the glitch can be removed even more effectively.

The pixel block combining part 21 also performs an operation similar to the above-described operation of the pixel block transfer part 23.

In the foregoing, the mode in which scramble processing is carried by using a mask smaller than the block size and the mode in which scramble processing is carried out with the blocks allotted so as to be offset from the endless pattern have been explained. The following is a description of scramble processing that is carried out by using a mask larger than the block size.

Figure 20:
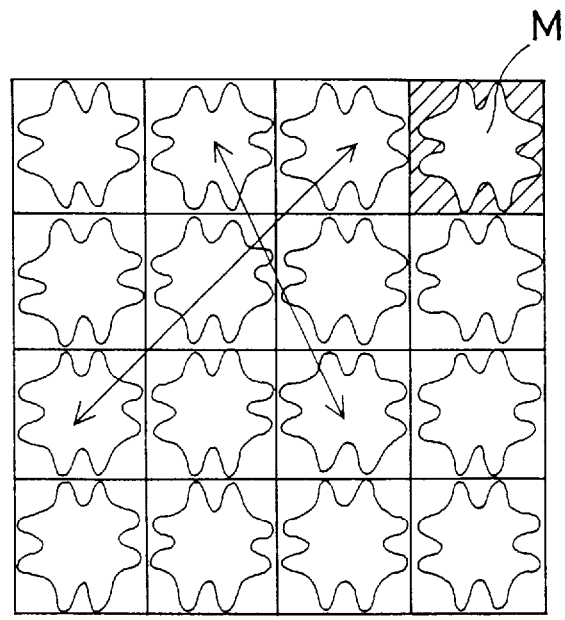
FIG. 20 shows the relationship between divided blocks and mask patterns in scramble processing.

First, the significance of providing the mode, in which a mask larger than the block size is used, will be explained. It is a matter of course that a glitch can be removed effectively by using a mask smaller than the block size, as described above. However, it has been revealed that a glitch cannot effectively be removed from some abstract patterns. More specifically, in the foregoing examples the relationship between each block of an endless pattern and a mask pattern is such as that shown in FIG. 20. FIG. 20 shows an example of a case where a mask pattern having a wavy contour is used. In this case, pixels in the edge portions (shown by the hatched lines in the figure) of a block, which are not included in the mask M, are not subjected to dissolve composition and left as they are. Such pixels are herein called "residual pixels". Such residual pixels may produce a new glitch.

Figure 21:
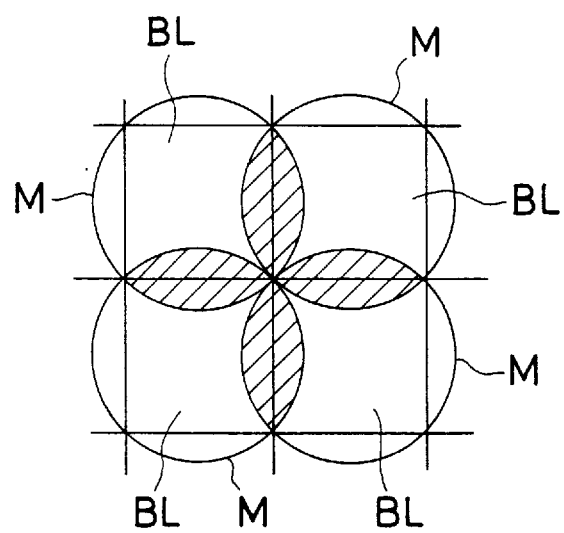
FIG. 21 is a view for explanation of a problem experienced when the mask size is merely made larger than the block size.

It may be considered that the occurrence of such a phenomenon can be prevented by making the mask pattern size larger than the block size. However, if pixel replacement or dissolve composition is executed, as described above, merely by making the mask size larger than the block size, the pattern is likely to lose its shape. Therefore, such a method is unfavorable. That is, assuming that the size of circular masks M is set larger than the size of blocks BL to execute replacement of the pixels in the masks M, as shown in FIG. 21, pixel replacement is carried out double in portions where a pair of adjacent masks overlap each other, as shown by the hatched portions in the figure, causing the pattern continuity to be impaired.

Figure 22:
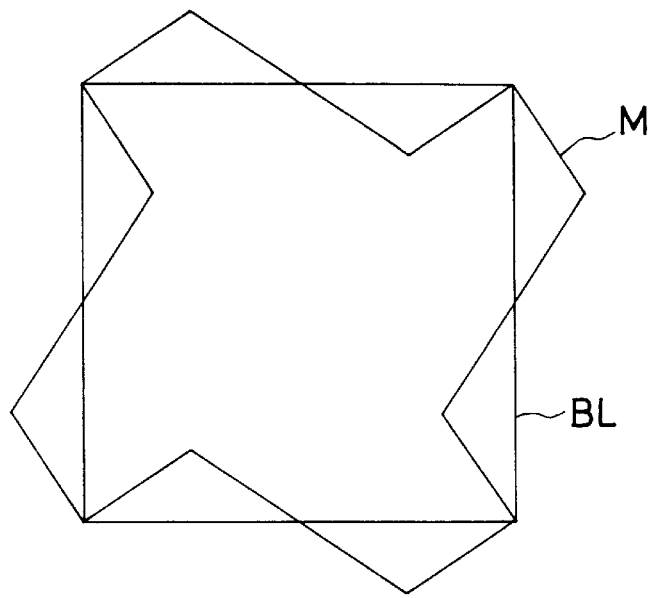
FIG. 22 shows one example of a mask pattern larger than the block size.
Figure 23:
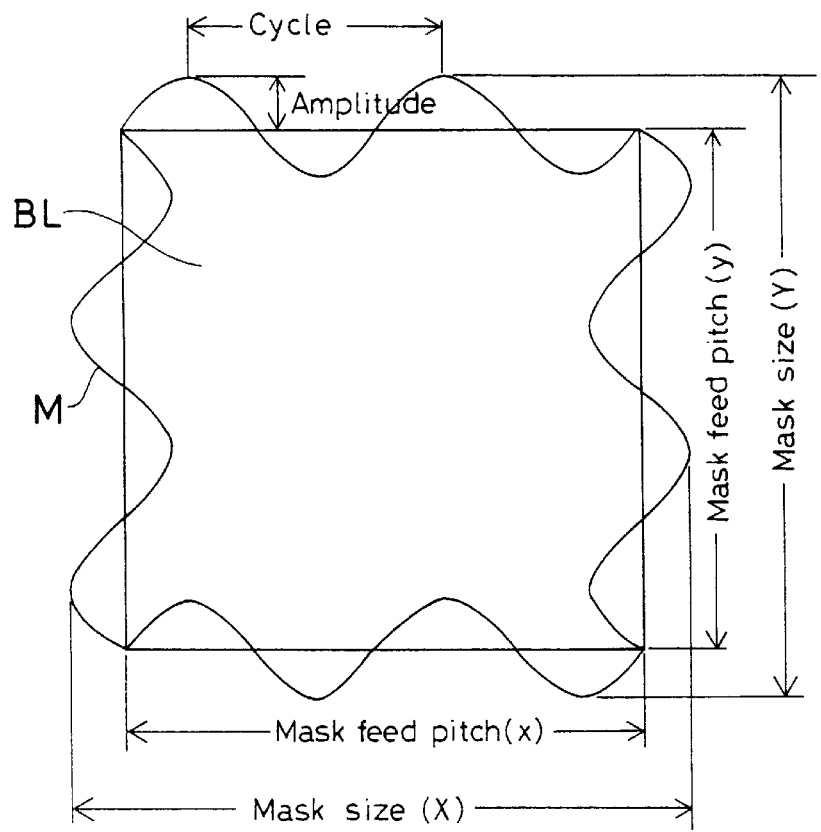
FIG. 23 shows one example of a preferable mask pattern which may be employed when the mask pattern size is set larger than the block size.

Accordingly, it will be understood that it is necessary in order to remove a glitch effectively not only to make the mask size larger than the block size but also to use a mask pattern having such a contour that each pair of adjacent masks engage with each other completely in butt-to-the-line form and in a key-and-keyhole relationship. As such a mask pattern, a mask with a triangular wave-shaped contour, as shown exemplarily by M in FIG. 22, may be considered. However, it has been confirmed that if a mask with a linear contour is used for pixel replacement or dissolve composition, a conspicuous edge is likely to be produced at the boundary between a pair of adjacent masks. Therefore, the contour of the mask is composed of smooth curves, e.g., wavy lines, and shaped so that each pair of adjacent masks engage with each other completely in butt-to-the-line form and in a key-and-keyhole relationship. FIG. 23 shows an example of such a mask pattern, in which the mask M has a sinusoidal contour. More specifically, the upper, lower, left and right edges of the mask M are formed of respective sinusoidal waves having the same number of cycles and the same amplitude. However, the number of cycles of one edge is limited to a natural number. In other words, each edge of the mask is formed of a sinusoidal wave of integer cycle. The mask size in the X-direction is determined by the maximum width of the sinusoidal waves of the left- and right-hand edges as viewed in the figure, and the mask feed pitch in the X-direction is equal to the dimension of the block BL in the X-direction. The same is the case with the factors in the Y-direction.

Although default values are set in the mask data part 25 for the number of cycles of the sinusoidal wave constituting each edge of the mask M and the amplitude value thereof, it is also possible for the operator to set such values through the input means 4.

Figure 24:
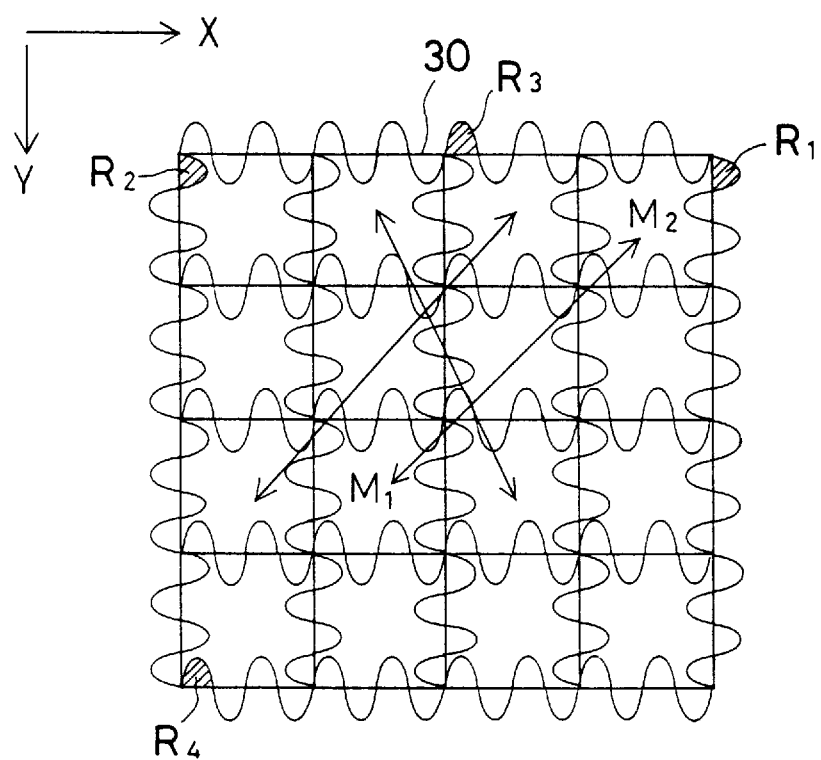
FIG. 24 is a view for explanation of a scramble processing operation in a case where the mask pattern as shown in FIG. 23 is employed.

When the mode, in which a mask pattern larger than the block size is used, is designated through the input means 4 and a number of cycles of the sinusoidal wave constituting each edge of the mask and an amplitude thereof are set, the display mode, which is carried out by the scramble processing part 10, is activated. Then, the image data on the endless pattern, which is stored in the memory means 5, is thinned out, and the thinned-out image data is spread in the frame memory 22 and also displayed on the color monitor 14, in the same way as the above. Then, the pixel block transfer part 23 executes replacement of the pixels in the mask patterns according to address pairs generated from the random address generating part 24 and with reference to the mask pattern sent from the mask data part 25. At this time, the pixel block transfer part 23 executes processing of moving pixels projecting from the endless pattern to sides opposite to the sides where they project. Assuming, for example, that the endless pattern is divided into 16 blocks (4×4 blocks) and the number of cycles of each edge of the mask is set to 2, the positional relationship between the masks and the blocks is such as that shown in FIG. 24. Assuming that a pair of addresses corresponding to the masks $M_1$ and $M_2$ are generated from the random address generating part 24, the pixel block transfer part 23 replaces the pixels in the masks $M_1$ and $M_2$ with each other in the same way as the above. By this pixel replacement, pixels in the mask $M_1$ are moved to the region $R_1$ so as to project from the endless pattern 30. Thus, the replacement of pixels in the masks causes some pixels to project from the endless pattern 30. Therefore, the pixel block transfer part 23 moves a portion which projects horizontally to the exact opposite position on the edge at the opposite side. As a result, the pixels in the region $R_1$, which is shown in FIG. 24, are moved to the region $R_2$. Accordingly, the region $R_2$ contains no residual pixels. The regions $R_1$ and $R_2$ have the same configuration. Therefore, it will be clear that a rectangular endless pattern is formed by the above-described processing.

Portions which project vertically are also moved to the edges at the opposite sides by the pixel block transfer part 23. However, the way of moving a projecting portion depends on the endless pattern repeat mode selected for making a baby plate. That is, when the mode that is shown at A in FIG. 34 is selected as an endless pattern repeat mode for making a baby plate, the pixel block transfer part 23 moves a projecting portion to the exact opposite position on the edge at the opposite side in the same way as in the case of the movement of a horizontally projecting portion. However, when the mode that is shown at B in FIG. 34 is selected as an endless pattern repeat mode for making a baby plate, the pixel block transfer part 23 moves a projecting portion to a position on the edge at the opposite side which is offset by ½ of the endless cycle. Accordingly, if in FIG. 24 the mode that is shown at B in FIG. 34 is selected as an endless pattern repeat mode for making a baby plate, the pixels in the region $R_3$ are moved to the region $R_4$.

By the above-described processing, residual pixels can be eliminated. In addition, since there is no possibility that pixel replacement will be carried out double at the boundary between a pair of adjacent blocks, as shown in FIG. 21, the pattern continuity will not be impaired.

Although the operation of the pixel block transfer part 23 has been described in the foregoing, it is a matter of course that the pixel block combining part 21 performs a similar operation, and that a gray scale mask pattern is used in the operation of the pixel block combining part 21.

Although in the foregoing description the block size and the mask pattern size are fixed, it is possible to enable these sizes to be set as desired. It is also possible to allow the operator to make a desired mask pattern and register it. Further, although the endless pattern is a multi-gradation image, it may be a binary image. In such a case, a binary mask is used also during the batch mode.

The foregoing is a description of the scramble processing part 10. Next, the pixel copy processing part 11 will be explained.

Figure 25:
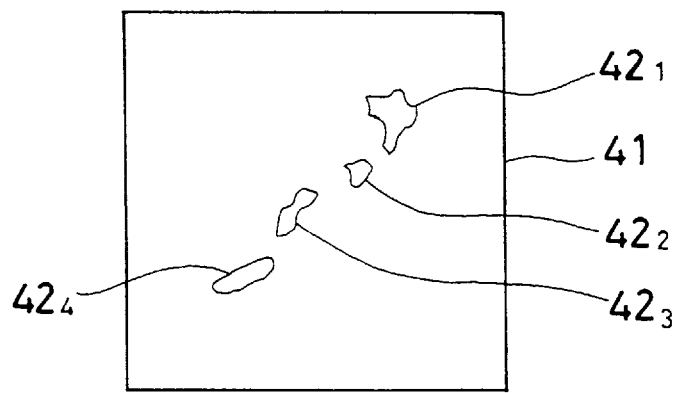
FIG. 25 is a view for explanation of the effectiveness of pixel copy scheme.

The pixel copy processing part 11 removes a glitch by the pixel copy scheme. The pixel copy scheme is suitable for removing a glitch from abstract patterns having a relatively large-sized characteristic pattern, e.g., marble grain pattern. More specifically, in a case where a unit material 41 has patterns $42_1$ to $42_4$ of relatively large size which line up in an archipelagic shape, as shown in FIG. 25, such an archipelagic pattern may cause a glitch. The pixel copy processing part 11 is prepared for removing a glitch from abstract patterns having such a characteristic pattern.

Figure 26:
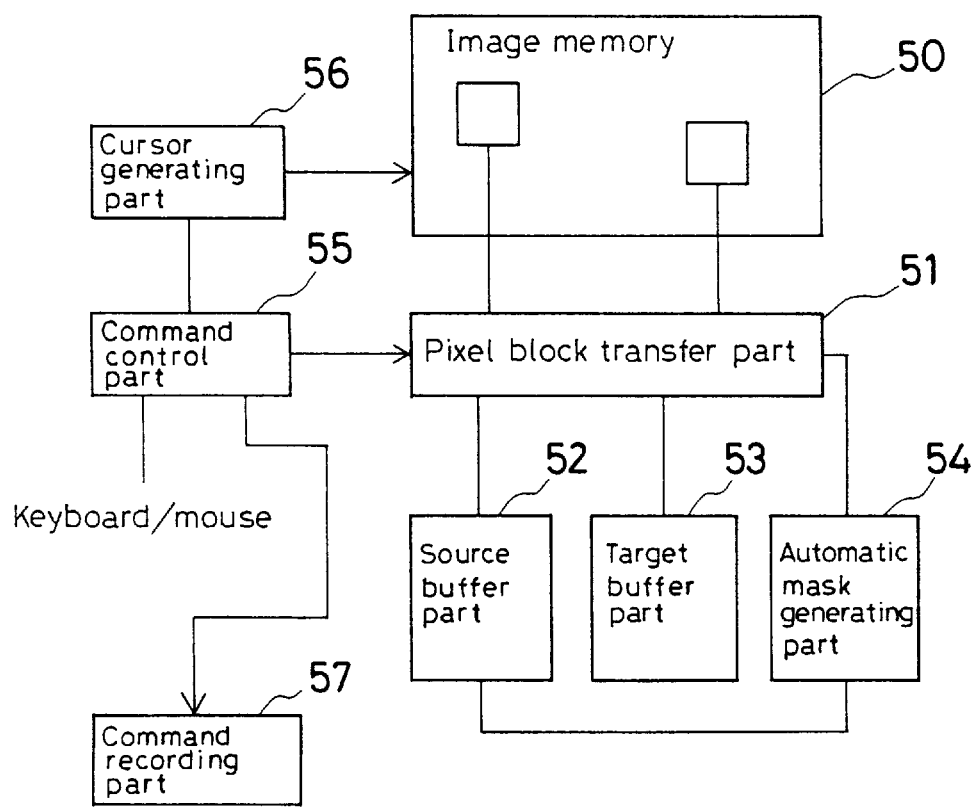
FIG. 26 shows one example of the arrangement of a pixel copy processing part.

The pixel copy processing part 11 is arranged as shown in FIG. 26 and has an interactive mode in which the operator simulates the glitch removal by the pixel copy scheme interactively on the screen of the color monitor 14, and a batch mode in which the same processing as that carried out in the interactive mode is automatically executed.

When glitch removal by the pixel copy scheme is instructed through the input means 4, the control means 3 activates the pixel copy processing part 11. At this time, the interactive mode is first activated. Consequently, the image data on the endless pattern is thinned out so that the number of pixels is below about $_2$k pixels×2k pixels, and the thinned-out image data is spread in an image memory 50. The image data in the image memory 50 is also sent to the display processing means 13, which is shown in FIG. 1, and displayed on the color display 14.

Figure 27:
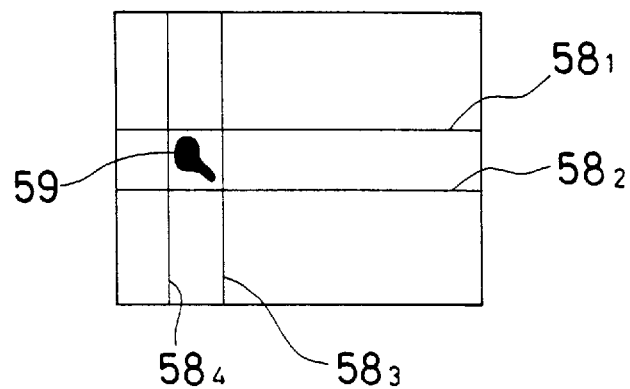
FIG. 27 shows exemplarily an image on the display screen during selection of a source pattern.

The operator views the screen of the color monitor 14 and designates a pattern which is to be moved (this pattern will hereinafter be referred to as "source pattern"). Designation of a source pattern is done by designating diagonal vertices of a region surrounding the source pattern with a mouse or the like. The movement of the mouse during the designating operation is sent to a command control part 55, so that a cursor pattern is generated in a cursor generating part 56 and written at the mouse position on the image memory 50. As a result, cursors $58_1$ to $58_4$ such as those shown in FIG. 27 are displayed on the screen of the color monitor 14, and the addresses of the cursors are recorded in a command recording part 57. It should be noted that reference numeral 59 in FIG. 27 denotes a source pattern.

When a rectangular region is designated in this way, the pixel block transfer part 51 transfers the pixel data in the rectangular region to a source buffer part 52. The contents of the source buffer part 52 are further transferred to an automatic mask generating part 54 where a mask of the source pattern is generated by the following processing. That is, the automatic mask generating part 54 first performs the calculation of 0.3R+0.59G+0.11B on the image data for three primary colors R, G and B, which is transferred from the source buffer part 52, thereby forming monochrome image data. Next, the monochrome image data is subjected to smoothing filtering a predetermined number of times, e.g., about 20 times. Thus, fine patterns are erased, and only patterns with relatively large areas are left. It should be noted that as the smoothing filtering process, it is possible to employ a known method, for example, a method wherein the values of 9 neighboring pixels are averaged.

Figure 28:
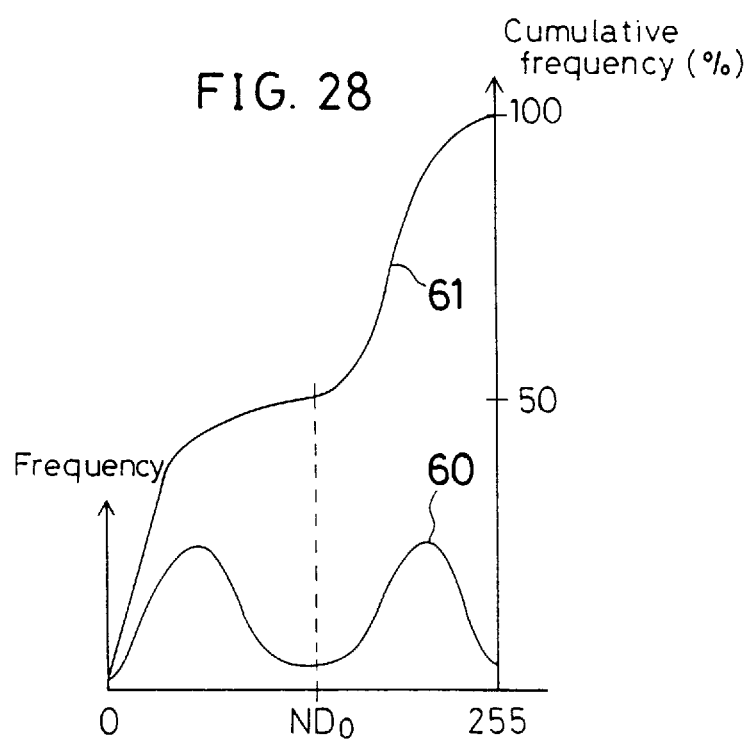
FIG. 28 is a view for explanation of a method of obtaining a threshold value for preparing mask data in the pixel copy scheme.
Figure 29:
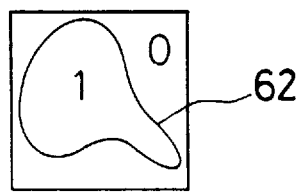
FIG. 29 is a view for explanation of binalization processing for preparing mask data.

After the smoothing filtering process, the automatic mask generating part 54 calculates a histogram of density values of pixels and then calculates as a threshold value a density value at which the cumulative frequency from the density 0 is about 50% and the frequency is the minimum. Then, the automatic mask generating part 54 determines a binarization direction from representative values in the peripheral and central portions of the rectangular region and executes binarization, thereby generating a mask of the source pattern. More specifically, assuming, for example, that the frequency of the level values of the pixels and the cumulative frequency are such as those shown by curves 60 and 61 in FIG. 28, $ND_0$ is calculated as a density value at which the cumulative frequency is about 50% and the frequency is the minimum, and this is determined to be a threshold value. Assuming that a contour 62 that is shown in FIG. 29 is obtained with the threshold value, "1" is given to the pixels inside the contour 62, while "0" is given to the pixels in the periphery of the contour 62, thereby effecting binarization to generate a source pattern mask. Thus, the periphery of the contour 62 is always masked. It should be noted that it is possible to allow the operator to set a threshold value as desired through the input means 4.

With the mask generated as described above, glitch removal is carried out. The removal operation is executed basically by copying the source pattern to another position. For this purpose, at least four commands, such as those described below, are prepared.

(1) Dragging Command

In the pixel copy scheme, the source pattern is copied by moving it to another position. In the copying process, the dragging command is used to move the source pattern to a desired position by dragging it. When the dragging command is designated and a position to which the source pattern is to be moved is designated with a cursor, the pixel block transfer part 51 defines the designated position as a target position, and it transfers the pixel block at the target position to a target buffer part 53 and copies the contents of the source buffer part 52 to the target position by referring to the mask pattern made in the automatic mask generating part 54. It should be noted that the pixel block that is transferred to the target buffer part 53 is used when the target position is changed by the subsequent cursor designation to restore the old target position to the previous state.

Figure 30:
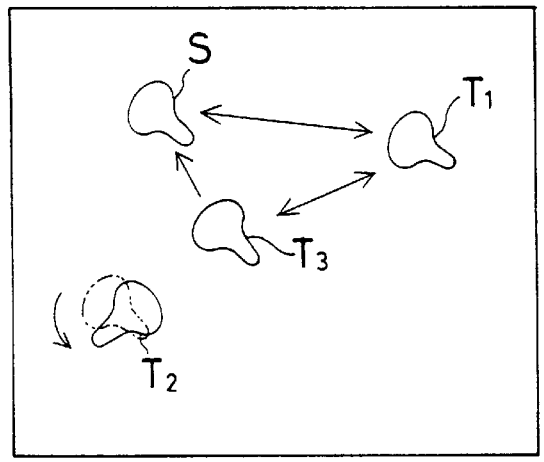
FIG. 30 is a view for explanation of the operation of the pixel copy processing part.

More specifically, assuming, for example, that a source pattern S is to be moved to a target position $T_1$, the operator picks the source pattern S with the mouse and moves it to the position $T_1$ as it is. Thus, the pixel block transfer part 51 takes in pixels at the target position $T_1$ with a rectangular region of the same size as that of the rectangular region set when the source pattern S was designated, and writes them into the target buffer part 53. Next, the pixel block transfer part 51 refers to the mask pattern generated in the automatic mask generating part 54 and writes at the target position $T_1$ the pixels in the region where the mask data is "1" among those stored in the source buffer part 52. Thus, the source pattern, which is at the position denoted by S in FIG. 30, is copied to the target position $T_1$. The result of the processing is sent to the display processing means 13, and it is displayed on the color monitor 14.

Next, when the target position changes from $T_1$ to $T_2$, the contents of the target buffer part 53 are returned to the position $T_1$, and processing similar to the above is executed with the position $T_2$ defined as a new target position.

(2) Rotating Command

In the pixel copy scheme, the source pattern can be not only moved with the angle unchanged but also rotated either clockwise or counterclockwise up to 360° by a predetermined unit angle, e.g., 90°, at a time when it is copied. The rotating command is used to execute this operation. When an angle of rotation is designated with the rotating command, the pixel block transfer part 51 refers to the mask data and copies the contents of the target buffer part 53 to the previous position of the target pattern. Next, the pixel block transfer part 51 rotates the contents of the source buffer part 52 and the mask data generated in the automatic mask generating part 54 by the designated angle, and copies the target position contents to the target buffer part 53 in the rotated state and also copies the contents of the source buffer part 52 to the target position by referring to the mask data.

Assuming, for example, that the pattern (shown by the chain line in FIG. 30) at the target position $T_2$ is to be rotated through 90° clockwise, the pixel block transfer part 51 first takes in pixels at the target position $T_2$ with a rectangular region of the same size as that of the rectangular region set when the source pattern S was designated, and writes them into the target buffer part 53. Next, the pixel block transfer part 51 rotates the contents of the source buffer part 52 and the mask data in the automatic mask generating part 54 through 90° clockwise, and takes the contents of the target position $T_2$ into the target buffer part 53 in the rotated state. The pixel block transfer part 51 further writes to the target position $T_2$ pixels in the region where the mask data is "1" among those written in the source buffer part 52. Thus, the pattern, which is at the chain-line position at $T_2$ in FIG. 30, is rotated to the solid-line position. The result of the processing is sent to the display processing means 13, and it is displayed on the color monitor 14.

(3) Source Pattern Erasing Command

When the source pattern is moved to another position to remove a glitch in the pixel copy scheme, it is necessary to erase the pattern at the original position. The source pattern erasing command is used to execute this operation. When this command is designated and a target position is also designated, the pixel block transfer part 51 refers to the mask data and copies the contents of the target buffer part 52 to the position of the source pattern.

Assuming, for example, that the source pattern S in FIG. 30 is to be erased and the pattern at the target position $T_3$ is to be copied to the position of the source pattern S, the pixel block transfer part 51 takes in pixels at the target position $T_3$ with a rectangular region of the same size as that of the rectangular region set when the source pattern S was designated by the dragging operation carried out as far as the position $T_3$, and writes at the source pattern position S pixels in the region where the mask data is "1" among those written in the target buffer part 53. Thus, in FIG. 30 the source pattern S is erased, and pattern at the target position $T_3$ is copied to the position of the source pattern S. The result of the processing is displayed on the color monitor 14.

(4) Pattern Replacing Command

This command is used to copy pixels at a first target position to a second target position by using mask data on the source pattern. When a first target and the pattern replacing command are designated, the pixel block transfer part 51 returns the contents of the target buffer part 53 to the first target position and copies a pixel block at the first target position, which includes the pixels to be copied, to the source buffer part 52. Next, when a second target position is designated, the pixel block transfer part 51 transfers the pixel block at the second target position, which is to be copied, to the target buffer part 53 and copies the contents of the source buffer part 52 to the second target position by referring to the mask data.

Assuming, for example, that it is designated to pick up pixels at the target position $T_1$ in FIG. 30 and copy them to the target position $T_3$, the pixel block transfer part 51 returns the contents of the target buffer part 53 to the target position $T_1$, and it writes the pixel block at the target position $T_1$ to the source buffer part 52 and also writes the pixel block at the target position $T_3$ to the target buffer part 53. Next, the pixel block transfer part 51 writes to the target position $T_3$ pixels in a region where the mask data is "1" among those written in the source buffer part 52. Thus, the pixels at the target position $T_1$ are copied to the target position $T_3$, and the result of this processing is displayed on the color monitor 14. It should be noted that the reason why a pixel block at the target position which is to be copied is temporarily transferred to the target buffer part 53 is to enable the previous state to be restored immediately when the result of the copying operation is not desirable.

Although four different kinds of command have been described in detail, there are prepared other commands, i.e., a command that is used to clear the data at the old target position and the contents of the target buffer part 53, return them to the initial state, and execute pixel copy processing, and an exit command which is used to copy the contents of the target buffer part 53 to the original target position with reference to the mask data to restore the image to the previous state, thereby allowing exit from the pixel copy processing. By combining these commands variously, glitches can be removed effectively.

The foregoing is a description of the operation of the system in the interactive mode. Commands, cursor coordinate values, etc. which are designated during the interactive mode are recorded in the command recording part 57 in the order in which they are designated by the operator through the input means 4.

When the interactive mode is completed, the batch mode is then activated. During the batch mode, original endless pattern image data is written into the image memory 50, and the commands, the cursor coordinate values, etc., which have been recorded in the command recording part 57, are read out sequentially and input to the command control part 55 to execute the designated processing. As a result, the same processing as that executed by the operator during the interactive mode is carried out on the original endless pattern data. Thus, the glitch is removed.

As has been described above, the pixel copy scheme enables even a glitch in an abstract pattern having relatively large patterns to be readily removed by an easy operation.

Figure 31:
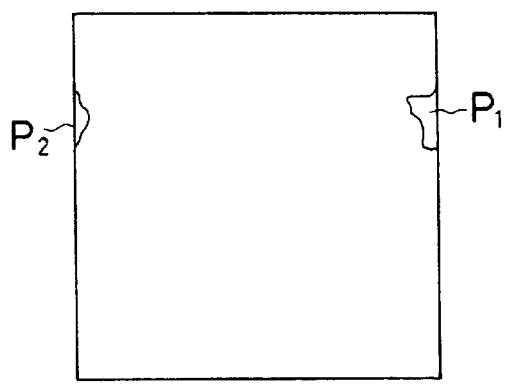
FIG. 31 is a view for explanation of the necessity of pattern rearrangement.

Incidentally, although the above-described processing can be carried out with respect to patterns which are all included in an endless pattern, such as the patterns $42_1$ to $42_4$ in FIG. 25, it is extremely difficult to perform the above-described glitch removal processing with respect to patterns which are divided by boundary portions of an endless pattern, such as patterns $P_1$ and $P_2$ in FIG. 31, during the preparation of the endless pattern. The reason for this is that patterns which are at the boundary of an endless pattern, such as the patterns $P_1$ and $P_2$ in FIG. 31, are important for maintaining the pattern continuity between a pair of adjacent endless patterns when a baby plate is made by repeating the endless pattern, as described later. For example, in FIG. 31, even if the pattern $P_1$ alone is moved to another position by pixel copy processing and, as a result, the glitch can be removed, it is clear that when the endless pattern concerned is repeated, the pattern continuity is lost at the boundaries between adjacent endless patterns. In addition, a pattern of the pattern discontinuity becomes tangible, so that a new glitch may occur.

Figure 32:
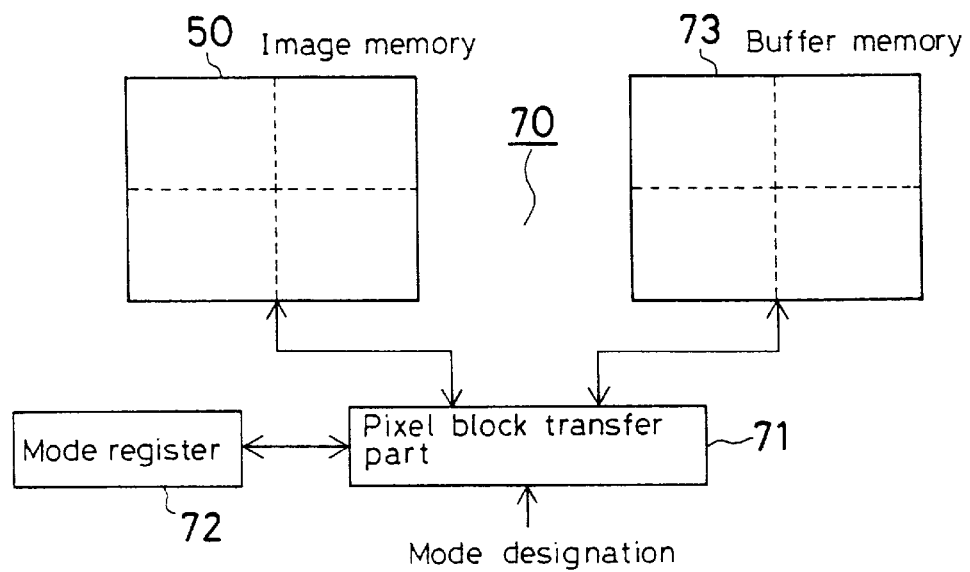
FIG. 32 shows one example of the arrangement of a pattern rearrangement processing part.
Figure 35A:
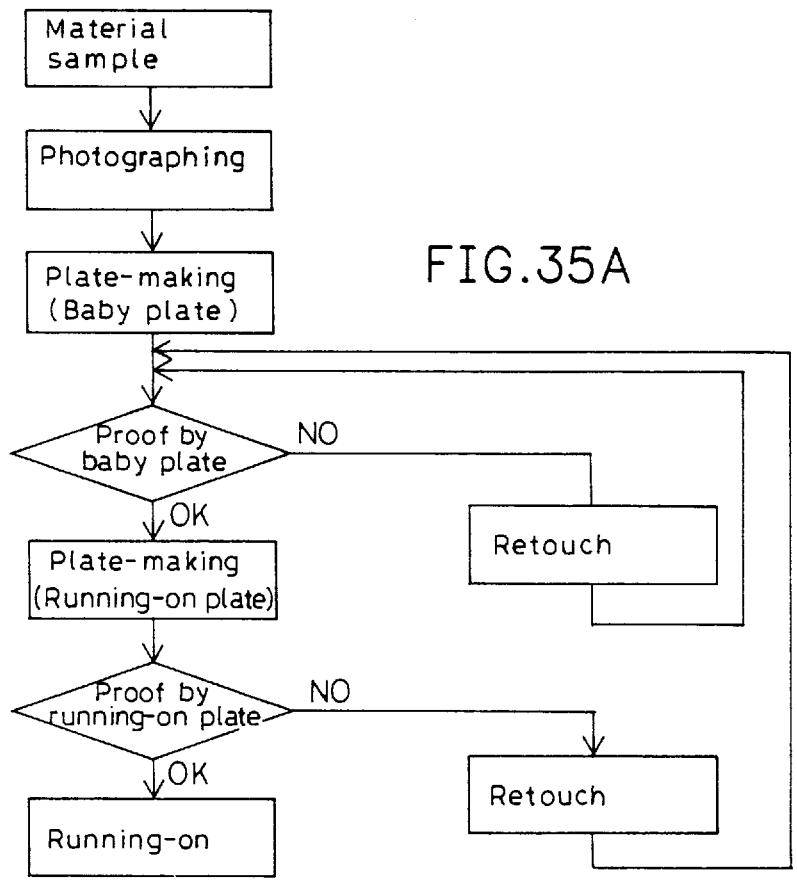
FIGS. 35A and 35B show one example of a conventional platemaking process for printing abstract patterns on architectural materials.
Figure 35B:
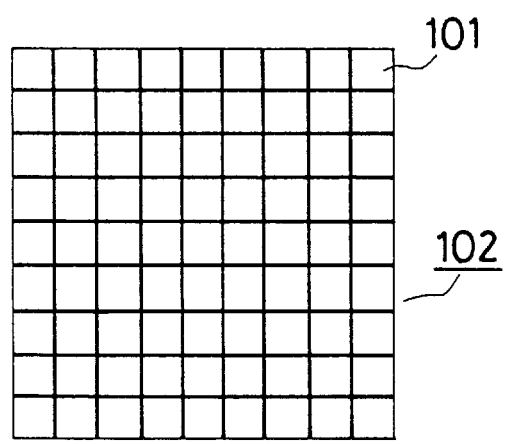
Figure 36A:
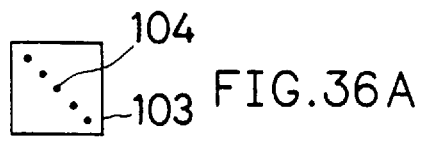
FIGS. 36A and 36D comprise view for explanation of glitch.
Figure 36B:
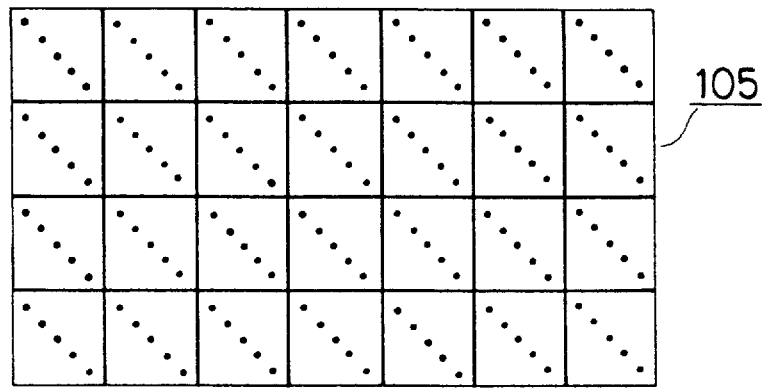
Figure 36C:
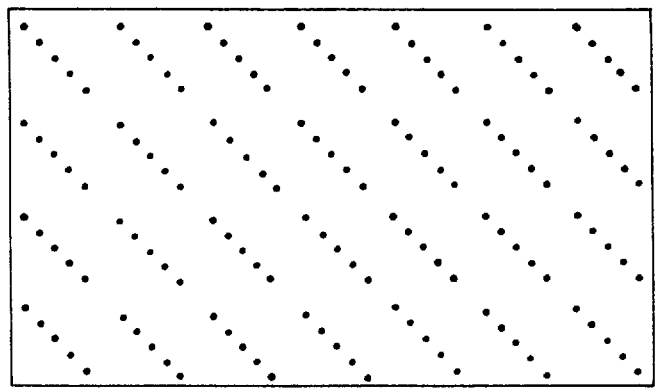
Figure 36D:
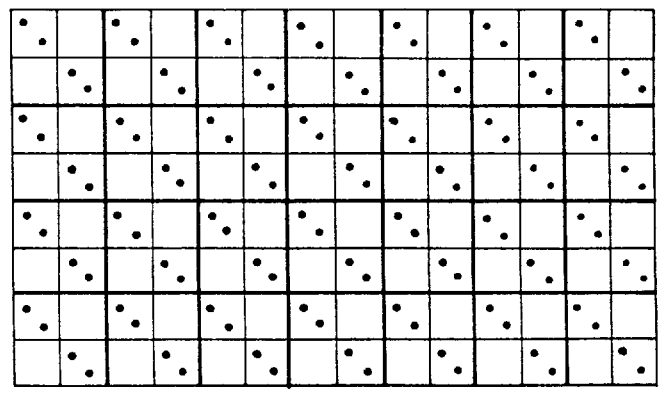

Therefore, the pixel copy processing part 11 is provided with a pattern rearrangement processing part 70, which has an arrangement as shown in FIG. 32, so that the glitch removal processing by the pixel copy scheme can be readily carried out even for patterns which are divided at boundary portions of an endless pattern, and the pattern continuity can be maintained when the endless pattern is repeated.

The operation of the pattern rearrangement processing part 70 will be described below. Prior to the description of the operation, modes of endless pattern will be explained. The endless pattern is equally divided into four blocks, i.e., upper, lower, left and right blocks. Six different modes, as shown at A to F in FIG. 33, are provided to correspond to six different arrangements of the four blocks. It should be noted that when the number of pixels in either the vertical or horizontal direction of the endless pattern is an odd number, pixels in one row or column are cut away.

The mode 0, which is shown at A in FIG. 33, is a mode showing the condition of the endless pattern itself. Assuming that the top left, top right, bottom left and bottom right blocks in the mode 0 are denoted by $R_1$, $R_2$, $R_3$ and $R_4$, respectively, the modes 1 to 5 respectively represent conditions where these blocks are arranged as shown at B to F in FIG. 33, and have the following meaning: Assuming that under the condition of the mode 0 there is a pattern which is separated into two parts which lie at the left-hand end of the block $R_1$ and the right-hand end of the block $R_2$, respectively, as in the case of the patterns $P_1$ and $P_2$ in FIG. 31, the mode of the endless pattern concerned is changed from the mode 0 to the mode 1 or the mode 3 or the mode 4, thereby allowing the two separate patterns to combine into one pattern. Thus, it will be understood that the glitch removal processing can be carried out even for patterns lying at the boundary portions of the endless pattern under the condition of the mode 0 by properly changing the mode and executing the above-described pixel copy processing in this state. Similarly, patterns which are separated to lie, for example, at the top left corner of the block $R_1$, the top right corner of the block $R_2$, the bottom left corner of the block $R_3$ and the bottom right corner of the block $R_4$, respectively, can be combined into one pattern by changing the mode from the mode 0 to the mode 3. By executing the pixel copy processing thereafter, the glitch can be removed. The same is the case with the other modes.

The pattern rearrangement processing part 70 is activated when a mode change instruction is given from the operator through the input means 4, and the designated mode value is sent to a pixel block transfer part 71. A mode register 72 has been stored with the mode value of the endless pattern spread in the image memory 50, which is shown in FIG. 26. The pixel block transfer part 71 makes a comparison between the mode value written in the mode register 72 and the designated mode value. When the two mode values are the same, no mode change is needed. Therefore, no processing is executed. However, when the mode value in the mode register 72 is different from the designated mode value, the pixel block transfer part 71 refers to the mode value in the mode register 72 and transfers the image data from the image memory 50 to the buffer memory 73 so that the block arrangement of the mode 0 is formed. It should be noted that the buffer memory 73 has the same memory capacity as that of the image memory 50.

Assuming, for example, that the mode value in the mode register 72 is 1, the pixel block transfer part 71, which recognizes the block arrangement of the mode 1, transfers the image data on the top left block in the image memory 50 to the top right block in the buffer memory 73. Similarly, the pixel block transfer part 71 transfers the image data on the top right, bottom left and bottom right blocks in the image memory 50 to the top left, bottom right and bottom left blocks in the buffer memory 73, respectively. Thus, the endless pattern of the mode 0 is written into the buffer memory 73. However, if the mode value written in the mode register 72 is 0, it is unnecessary to change the arrangement of the blocks $R_1$, $R_2$, $R_3$ and $R_4$ of the endless pattern. Therefore, the pixel block transfer part 71 copies the contents of the image memory 50 to the buffer memory 73 without changing the block arrangement.

Next, the pixel block transfer part 71 reads image data from the buffer memory 73 according to the designated mode, which is sent thereto, and spreads the data in the image memory 50 so that the designated mode is realized. Assuming, for example, that the mode 5 is designated, the pixel block transfer part 71 transfers the image data on the top left block in the buffer memory 73 to the bottom left block in the image memory 50. Similarly, the pixel block transfer part 71 transfers the image data on the top right, bottom left and bottom right blocks in the buffer memory 73 to the bottom right, top right and top left blocks in the image memory 50. Thus, the endless pattern of the mode 5 is written into the image memory 50. However, if the mode 0 is designated, the pixel block transfer part 71 copies the contents of the buffer memory 73 to the image memory 50 without changing the block arrangement. Upon completion of the transfer of the image data from the buffer memory 73 to the image memory 50, the pixel block transfer part 71 rewrites the contents of the mode regsiter 72 to the designated mode value, thus completing the pattern rearrangement processing.

Thus, the operator views the first endless pattern, that is, the endless pattern of the mode 0, and if it is judged that a mode change is necessary, he or she gives a mode change instruction through the input means 4. After the completion of the above-described pattern rearrangement processing, the operator executes the glitch removal processing by the pixel copy scheme. Upon completion of the glitch removal processing, the operator gives a mode change instruction again to return the endless pattern mode to the mode 0 automatically.

It should be noted that a mode change instruction cannot designate any of the 6 modes, which are shown in FIG. 33, but available modes depend on the endless pattern repeat mode selected for making a baby plate. That is, when the mode that is shown at A in FIG. 34 is selected as an endless pattern repeat mode for the baby plate making process, only 4 modes, i.e., the modes 0, 1, 2 and 3, in FIG. 33 can be selected. When the mode that is shown at B in FIG. 34 is selected, only 4 modes, i.e., the modes 0, 1, 4 and 5, can be selected.

Although in the foregoing embodiment the pattern rearrangement processing part 70 is included in the pixel copy processing part 11, the arrangement may be such that the pattern rearrangement processing part alone is formed as a separate unit and connected to the control means 3 by a high-speed bus or a communication network. In addition, the image data processing method for pattern rearrangement is not limited to that in the described embodiment, but various other image data processing methods are available for pattern rearrangement. Further, although in the foregoing embodiment the pixel block transfer part 71 is arranged as a unit which is separate from the pixel block transfer part 51 in FIG. 26, the transfer part 51 may be used in common.

Thus, with the abstract pattern plate-making system, shown in FIG. 1, if a glitch is judged to be present at Step S3 in FIG. 2, it can be removed by either the scramble scheme or the pixel copy scheme.

After the glitch has been removed in the stage of the endless pattern by the processing executed at Step S4 in FIG. 2, baby plate data is prepared (Step S5). A baby plate is made simply by repeating the endless pattern a predetermined times both vertically and horizontally. The repeat processing part 12 is prepared for this operation.

When a baby plate making instruction is given through the input means 4, the control means 3 activates the repeat processing part 12. Thus, the repeat processing part 12 repeats the image data on the endless pattern a predetermined number of times both vertically and horizontally. As the way of repeating the endless pattern, two modes are prepared: one in which the endless pattern is repeated regularly both vertically and horizontally, as shown at A in FIG. 34; and another mode in which the endless pattern is repeated so that the patterns are staggered by ½ of the endless cycle, as shown at B in FIG. 34. Which mode is to be used to repeat the endless pattern is designated by the operator through the input means 4. It should be noted that the right-hand half of the endless pattern $E_1$ at the right-hand end in the endless pattern arrangement shown at B in FIG. 34 has been moved to the opposite side, as shown by reference symbol $E_2$ in the figure.

The baby plate data thus prepared is registered at the memory means 5.

Upon completion of the making of a baby plate, it is checked again whether or not a glitch is present in the stage of the baby plate (Step S6). In this case, the check for the presence of a glitch may be made by displaying the image of the baby plate on the color monitor 14 with the baby plate data thinned out. However, the baby plate is large in size, and the purpose of the baby plate is to make presentation for the user. Therefore, it is preferable to feed the baby plate data from the memory means 5 to the color printer 7 to provide a hard copy.

If a glitch is found at Step S6, the process returns to Step S4 to carry out the above-described glitch removal processing, whereas, if no glitch is found, the baby plate data is output (Step S7). There are two different methods of outputting the baby plate data. One is a method in which the baby plate data is supplied directly to the gravure engraving machine 6 to make a press plate directly. The other is a method in which the baby plate data is output in the form of film from the output scanner 2 and a press plate is made through the film. Which method is to be employed may be determined as desired.

After a baby press plate has been made as described above, proofing is carried out by using the plate, and it is checked again whether or not a glitch is present (Step S8). If a glitch is found, the process returns to Step S1 to start again from reading of a unit material, or the process returns to Step S4 to carry out glitch removal in the stage of the endless pattern. When the process returns to Step S1, all steps which have already been done so far go to waste, but the loss can be minimized because the process is automated and hence the cost and the work load are reduced correspondingly in comparison to the prior art.

When no glitch is present in the proof made by using the baby plate, running-on plate data is output (Step S9). This is done by repeating the baby plate data a predetermined number of times both vertically and horizontally with the repeat processing part 12. The running-on plate data thus prepared is registered at the memory means 5, and it is also output. The running-on plate data may be supplied to the gravure engraving machine 6 to make a running-on plate directly, or it may be output in the form of film from the output scanner 2 so that a press plate is made through the film, in the same way as in the case of the baby plate data.

After the running-on plate data has been output as described above, proofing is carried out again (Step S10) to make a final check. If OK is got, an actual printing operation is conducted by using the running-on plate (Step S11). Thus, the process is completed. It should be noted that if a glitch is found in the proof made by using the running-on plate, the process returns to Step S1 or S4 to repeat the procedure.

What we claim is:

1. A printed matter having an endless pattern printed thereon said endless pattern comprising repeated first pattern data, wherein said first pattern data is repeated a predetermined number of times both vertically and horizontally, wherein said first pattern data comprises two randomly selected blocks of a second endless pattern data which is divided into blocks, combined together by a composition technique using mask data having a predetermined pattern, thereby obtaining said pattern of first pattern data, wherein the repeated first pattern data is incorporated in a press plate, and said press plate is employed to print said printed matter.

2. A printed matter according to claim 1, wherein said mask data is multi-valued data having gradation.

3. A printed matter according to claim 2, wherein said composition technique is dissolve composition.

4. A printed matter according to claim 1, wherein said mask has a size larger than a size of each of the divided blocks.

5. A printed matter according to claim 4, wherein said mask has edges which are defined by smooth curved lines and is shaped so that each pair of adjacent masks engage with each other completely in butt-to-the-line form and in a key-and-keyhole relationship.

6. A printed matter according to claim 5, wherein said smooth curved lines are sinusoidal curves.

7. A printed matter having an endless pattern printed thereon wherein said endless pattern comprises a first endless pattern repeated a predetermined number of times both vertically and horizontally, said first endless pattern comprising endless pattern data divided into blocks, wherein pattern data in two blocks selected at random from among said divided blocks are replaced with each other or combined together by using mask data having a predetermined pattern, wherein a region of said mask data having a predetermined pattern which projects from said endless pattern is moved to a side opposite to a side where it projects, thereby removing an undesired pattern from said endless pattern, wherein the resulting endless pattern is employed in a press plate that is used for printing said printed matter.

8. A printed matter according to claim 7, wherein said projecting region of said mask pattern is moved to a position, which directly faces the position where it projects, at a side opposite to the side where said region projects.

9. A printed matter according to claim 7, wherein said projecting region of said mask pattern is moved to a position, which is offset from the position where it projects by ½ pitch of an endless cycle, at a side opposite to the side where said region projects.

10. A printed matter having an endless pattern printed thereon wherein said endless pattern comprises a first endless pattern repeated a predetermined number of times both vertically and horizontally, wherein said first endless pattern comprises pixel data copied from a predetermined position of endless pattern data to another predetermined position on the basis of mask data, wherein said mask data is related to pattern data at a predetermined position of said endless pattern data, and wherein said endless pattern data is divided into a predetermined number of blocks and said divided blocks are subjected to pattern rearrangement, whereby the resulting endless pattern is employed in a press plate that is used for printing said printed matter.

* * * * *